US012700602B2

(12) United States Patent
Hoogduin et al.

(10) Patent No.: US 12,700,602 B2
(45) Date of Patent: Aug. 4, 2026

(54) SYSTEMS AND METHODS FOR MONITORING A FUEL CELL

(71) Applicant: Hyster-Yale Group, Inc., Fairview, OR (US)

(72) Inventors: Joost Hoogduin, Nijmegen (NL); Neha Roy, Arnhem (NL)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 538 days.

(21) Appl. No.: 18/095,701

(22) Filed: Jan. 11, 2023

(65) Prior Publication Data

US 2024/0234762 A1 Jul. 11, 2024

(51) Int. Cl.
| | |
|---|---|
| *H01M 8/04664* | (2016.01) |
| *G01M 3/00* | (2006.01) |
| *G06N 20/10* | (2019.01) |
| *H01M 8/0432* | (2016.01) |
| *H01M 8/0438* | (2016.01) |
| *H01M 8/04537* | (2016.01) |

(Continued)

(52) U.S. Cl.
CPC ......... *H01M 8/04664* (2013.01); *G01M 3/00* (2013.01); *G06N 20/10* (2019.01); *H01M 8/0432* (2013.01); *H01M 8/0438* (2013.01); *H01M 8/04604* (2013.01); *H01M 8/04955* (2013.01); *H01M 8/04992* (2013.01); *H01M 2250/20* (2013.01)

(58) Field of Classification Search
CPC ........... H01M 8/04664; H01M 8/0432; H01M 8/0438; H01M 8/04604; H01M 8/04955; H01M 8/04992; H01M 8/04388; H01M 8/04313; H01M 8/04619; H01M 2250/20; G01M 3/00; G06N 20/10; G06N 20/00; Y02E 60/50

See application file for complete search history.

(56) References Cited

U.S. PATENT DOCUMENTS

| | | | |
|---|---|---|---|
| 6,712,101 B1 * | 3/2004 | Nanaji | B67D 7/0496 |
| | | | 141/94 |
| 2012/0015268 A1 | 1/2012 | Yoshida et al. | |

(Continued)

OTHER PUBLICATIONS

European Search Report, EPO Pat. Appl. 24150849.8 (Jan. 29, 2025).

(Continued)

*Primary Examiner* — Lal Ce Mang

(57) ABSTRACT

A monitoring device tracks a plurality of related metrics, each related metric configured to monitor the same characteristic of a fuel cell system based on different types of data. The related metrics may include a first metric derived from direct measurements of the characteristics and a second metric. The second metric may be inferred from indirect measurements of the characteristic. An analysis module may detect a potential fuel leak based, at least in part, on an error, difference, deviation, and/or other comparative analysis of the related metrics. Alternatively, or in addition, potential fuel leaks may be detected by use of an artificial intelligence, machine learned and/or machine learning (AI/ML) model trained to identify related metrics that are indicative of anomalous operation of the fuel cell system, such as operation under fuel leak conditions.

29 Claims, 12 Drawing Sheets

900 ➔

(51) Int. Cl.
　　*H01M 8/04955*　　(2016.01)
　　*H01M 8/04992*　　(2016.01)

(56)　　　　　　　References Cited

U.S. PATENT DOCUMENTS

| | | | |
|---|---|---|---|
| 2012/0028153 A1* | 2/2012 | Shigezumi | H01M 8/04679 |
| | | | 429/432 |
| 2013/0017465 A1* | 1/2013 | Harris | H01M 8/04302 |
| | | | 429/444 |
| 2015/0346007 A1* | 12/2015 | James | G01M 3/40 |
| | | | 702/45 |
| 2017/0040626 A1* | 2/2017 | Mousa | H01M 8/1018 |
| 2017/0162891 A1* | 6/2017 | Kojima | H01M 8/04873 |
| 2018/0166717 A1* | 6/2018 | Ryu | H01M 8/04671 |
| 2020/0019893 A1* | 1/2020 | Lu | G06N 5/025 |
| 2021/0249672 A1* | 8/2021 | Kou | H01M 8/04753 |
| 2022/0285706 A1* | 9/2022 | Yokoo | H01M 8/04731 |
| 2023/0378497 A1* | 11/2023 | Kim | H01M 8/04753 |

OTHER PUBLICATIONS

Response to European Search Report, EPO Patent Appl. No. 24150849.8 (Aug. 25, 2025).

* cited by examiner

100

800

Monitor a plurality of related metrics pertaining to the same characteristic, including a first metric derived from first monitoring data and a second metric derived from second monitoring data different from the first monitoring data
810

Analyze the related metrics
820

Trigger Detection of Fuel Leak?
830

Yes

No

Implement Mitigation Action(s)
850

900

SYSTEMS AND METHODS FOR MONITORING A FUEL CELL

TECHNICAL FIELD

Embodiments relate to systems, methods, devices, and non-transitory computer-readable storage media for monitoring a fuel-cell system and, in particular, detecting leaks in a fuel-cell system.

BACKGROUND OF THE INVENTION

Unless otherwise explicitly indicated, the approaches described in the technical field and background sections are not prior art to the claims in this disclosure nor admitted prior art.

A fuel cell (FC) is an electrochemical cell that converts chemical energy of a fuel and an oxidizing agent into electricity through a pair of redox reactions. The fuel is often a volatile substance, such as hydrogen ($H_2$). Fuel cells have several advantages as compared to conventional batteries. For example, fuel cells can produce electrical power continuously, per the availability of sufficient fuel and oxidizing agent (e.g., oxygen or untreated air). Furthermore, the time required to refuel a fuel cell may be significantly less than the time required to charge a battery.

A fuel cell may comprise an electrolyte that allows ions to move between an anode and cathode. The anode can include a catalyst designed to cause the fuel to undergo oxidation reactions that generate electrons and ions (e.g., positively charged hydrogen ions); ions flow from the anode to the cathode through the electrolyte while electrons flow from the anode to the cathode through an external circuit, thereby supplying direct current (DC) electrical power to a load. The cathode may include another catalyst designed to cause ions, electrons, and oxygen to react, forming water and possibly other byproducts.

Individual fuel cells produce relatively small electrical potentials, e.g., about 0.7 volts between terminals. Therefore, multiple fuel cells are often arranged into "stacks" or other configurations. A "stack" may comprise a plurality of fuel cells having terminals connected in electrical series to thereby produce sufficient voltage to meet specified requirements. To achieve a desired voltage potential (V) a stack may be designed to include (M) fuel cells connected in series, where M=V/0.7.

Fuel may be maintained in a gaseous state in one or more storage tanks or other suitable means. Fuel leaks can be dangerous given the volatile nature of the fuels used in many fuel-cell systems (FCSs). For example, at sufficient concentrations (e.g., between 4 and 74% in air), hydrogen fuel can pose a significant combustion or even explosion risk. Moreover, given the small molecule size of $H_2$, hydrogen fuel cell systems are especially susceptible to leaks. Moreover, since $H_2$ is lighter than air, leaked fuel can accumulate within enclosed portions or "pockets" of a structure. To help mitigate these risks, fuel cell systems may include sensors to detect leaks, e.g., $H_2$ sensors or the like. The sensors may be strategically placed at locations where leaks are likely to occur such as the fuel cells themselves, connection points between the fuel storage and the fuel cells, and so on. The sensors may alert operators of leakage conditions and/or prevent operation of the FCS until the detected leakage conditions are remedied.

As mentioned above, given the small molecule size of FC fuel (e.g., $H_2$), it may be difficult to prevent all fuel leakage. Therefore, fuel cell systems may comprise means for preventing fuel accumulation, such as ventilation means and/or the like. Accumulation prevention means can provide important safety benefits, but can reduce the efficacy of conventional leak detection and may even prevent sensors from detecting relatively small fuel leaks and/or may reduce the detection range of the sensors (e.g., prevent the sensors from detecting leaks outside a proximity).

Overview of Disclosure

This overview is provided to introduce a selection of concepts in a simplified form that are further described in greater detail below. This overview is not intended to identify key or essential inventive concepts of the claimed subject matter, nor is it intended for limiting the scope of the claimed subject matter. Some example embodiments, alternative embodiments, and selectively cumulative embodiments are set forth below:

Disclosed herein are examples of a method for monitoring a fuel cell system. Embodiments of the disclosed method may comprise deriving a first metric from first monitoring data, the first metric configured to track a specified characteristic of the fuel cell system during a monitoring period, deriving a second metric from second monitoring data, the second metric configured to track the specified characteristic of the fuel cell system during the monitoring period, and determining whether to trigger detection of a fuel leak in the fuel cell system based on an analysis of the first metric and the second metric. The specified characteristic may pertain to one or more of: a power output of the fuel cell system, fuel consumption of the fuel cell system, and a rate of change of the fuel consumption. The analysis may comprise comparing a deviation between the first metric and the second metric to a threshold. The start time of the monitoring period may correspond to a fueling time of the fuel cell system (e.g., the most recent or last fueling time).

The first monitoring data used to derive the first metric may comprise direct measurements of the specified characteristic and the second monitoring data may comprise indirect measurements pertaining to the specified characteristic. In some implementations, deriving the second metric comprises determining expected values of the specified characteristic from the indirect measurements.

In some embodiments, the specified characteristic comprises a fuel consumption of the fuel cell system and the first monitoring data comprises measurements acquired from one or more of the fuel cell system, fuel storage of the fuel cell system, and a fuel coupling of the fuel cell system. The first monitoring data may comprise measurements of one or more of: a temperature of fuel within the fuel storage of the fuel cell system, a pressure of the fuel, a mass of the fuel, fuel inflow to the fuel cell system, and fuel outflow from the fuel cell system. The second monitoring data may be configured to quantify one or more of an output power of the fuel cell system and an input power supplied to a load coupled to the fuel cell system and may be derived by use of power efficiency data pertaining to the fuel cell system.

Alternatively, the specified characteristic may correspond to power generated by the fuel cell system. In these implementations, the first monitoring data may comprise power measurements and the second monitoring data may comprise measurements pertaining to fuel consumption by the fuel cell system.

In some implementations, detecting the fuel leak comprises configuring a machine-learned model to determine a leak prediction for the fuel cell system based on features extracted from the first metric and the second metric, the features indicating a difference between a rate of change of the first metric and a rate of change of the second metric at respective times within the monitoring period. Some implementations of the disclosed method may comprise training the machine-learned model to distinguish features corresponding to non-anomalous operation of the fuel cell system from anomalous operation of the fuel cell system, the anomalous operation corresponding to a fuel leak condition. The machine-learned model may comprise one or more of a linear regression predictor and a support vector machine.

Some embodiments of the disclosed method may further include implementing a mitigation action in response to detecting the fuel leak in the fuel cell system, the mitigation action comprising disabling operation of the fuel cell system.

Disclosed herein are examples of a device and/or apparatus to monitor a fuel cell system of a machine. The apparatus may comprise a processor operatively coupled to a memory and a monitoring module configured for operation on the processor, the monitoring module configured to determine a first metric configured to track a specified operational characteristic of the fuel cell system, the first metric derived from first monitoring data comprising measurements of the specified characteristic, and determine a second metric configured to track the specified operational characteristic of the fuel cell system, the second metric comprising estimates of the specified operational characteristic derived from second monitoring data having a defined physical relationship to the specified operational characteristic. The apparatus may further include an analysis module configured to determine whether to trigger detection of a fuel leak based, at least in part, on analysis the first metric and the second metric. In some implementations, the apparatus may further include a mitigation module configured to, inter alia, disable operation of the fuel cell system in response to detection of a fuel leak by the analysis module.

The specified operational characteristic may pertain to fuel consumption of the fuel cell system, and the apparatus may further comprise a first monitoring unit configured to receive first monitoring data, the first monitoring data acquired from one or more of the fuel cell system, fuel storage of the fuel cell system, and a fuel coupling of the fuel cell system. The first monitoring data may comprise direct measurements pertaining to the fuel consumption of the fuel cell system, the direct measurements including one or more of a temperature of fuel stored within the fuel storage, a pressure of the fuel, a mass of the fuel, fuel inflow to the fuel cell system, and fuel outflow from the fuel cell system. The first metric may be derived from the direct measurements pertaining to the fuel consumption of the fuel cell system.

The disclosed apparatus may further comprise a second monitoring unit configured to acquire the second monitoring data from one or more of the fuel cell system and a load coupled to the fuel cell system, the second monitoring data comprising indirect measurements pertaining to the fuel consumption of the fuel cell system, the indirect measurements including one or more of power generated by the fuel cell system and power supplied to the load coupled to the fuel cell system. The second metric may be derived from the indirect measurements and power efficiency data pertaining to the fuel cell system.

Alternatively, in some implementations, the specified operational characteristic may pertain to a power output of the fuel cell system, and the apparatus may further comprise a first monitoring unit configured to acquire the first monitoring data from one or more of the fuel cell system and a load coupled to the fuel cell system, the first monitoring data comprising direct measurements pertaining to the power output of the fuel cell system, the direct measurements comprising one or more of power generated by the fuel cell system and power supplied to the load coupled to the fuel cell system, wherein the first metric is derived from the direct measurements, and a second monitoring unit configured to receive the second monitoring data, the second monitoring data acquired from one or more of the fuel cell system, fuel storage of the fuel cell system, and a fuel coupling of the fuel cell system, the second monitoring data comprising indirect measurements pertaining to the power output of the fuel cell system, the indirect measurements comprising one or more of a temperature of fuel stored within the fuel storage, a pressure of the fuel, a mass of the fuel, fuel inflow to the fuel cell system, and fuel outflow from the fuel cell system, wherein the second metric is derived from the indirect measurements and power efficiency data pertaining to the fuel cell system.

The analysis module of the disclosed apparatus may be configured to implement one or more of: a deviation analysis, the deviation analysis comprising evaluating a deviation between the first metric and the second metric, a cumulative deviation analysis, the cumulative deviation analysis comprising evaluating a cumulative deviation between the first metric and the second metric, a rate of change analysis, the rate of change deviation comprising evaluating a deviation between a rate of change of the first metric and a rate of change of the second metric at respective times during a monitoring period, the monitoring period corresponding to a fuel cycle of the fuel cell system, and an artificial intelligence and/or machine-learned analysis. In some implementations, the apparatus comprises an artificial intelligence and/or machine-learned model configured to determine whether to trigger detection of a fuel leak, the model may comprise one or more of a linear regression predictor and a support vector machine.

Disclosed herein are examples of non-transitory computer-readable storage media comprising instructions configured to cause a processor of a computing device to implement operations for monitoring a fuel cell system of a machine. The operations may comprise deriving a first metric from first monitoring data, the first metric configured to track fuel consumed by the fuel cell system, the first monitoring data comprising measurements of one or more of a temperature of fuel stored within fuel storage of the fuel cell system, a pressure of the fuel, a mass of the fuel, an inflow of fuel to the fuel cell system, and an outflow of fuel from the fuel cell system, deriving a second metric from second monitoring data, the second metric comprising estimates of the fuel consumed by the fuel cell system derived from indirect measurements of the second monitoring data and power efficiency data pertaining to the fuel cell system, the indirect measurements comprising one or more of a power output of the fuel cell system and power supplied to a load coupled to the fuel cell system, and detecting a leak in the fuel cell system based on an analysis of the first metric and the second metric.

In some implementations, the operations further comprise receiving the first monitoring data, the first monitoring data acquired from one or more of the fuel cell system, the fuel storage of the fuel cell system, and a fuel coupling of the fuel cell system, and receiving the second monitoring data, the second monitoring data acquired from one or more of the fuel cell system and the load coupled to the fuel cell system.

The analysis may comprise one or more of: a deviation analysis, the deviation analysis comprising evaluating a deviation between the first metric and the second metric, a cumulative deviation analysis, the cumulative deviation analysis comprising evaluating a cumulative deviation between the first metric and the second metric within a determined monitoring period, the monitoring period corresponding to a fuel cycle of the fuel cell system, a rate of change analysis, the rate of change deviation comprising evaluating a deviation between a rate of change of the first metric and a rate of change of the second metric at respective times during the monitoring period, and an artificial intelligence and/or machine-learned analysis. In some implementations, the analysis comprises evaluation of one or more of a linear regression predictor and a support vector machine decision boundary.

BRIEF DESCRIPTION OF DRAWINGS

Examples of systems, methods, devices, and computer-readable storage media for monitoring a fuel cell are set forth in the accompanying figures and detailed description.

DETAILED DESCRIPTION

Figure 1:
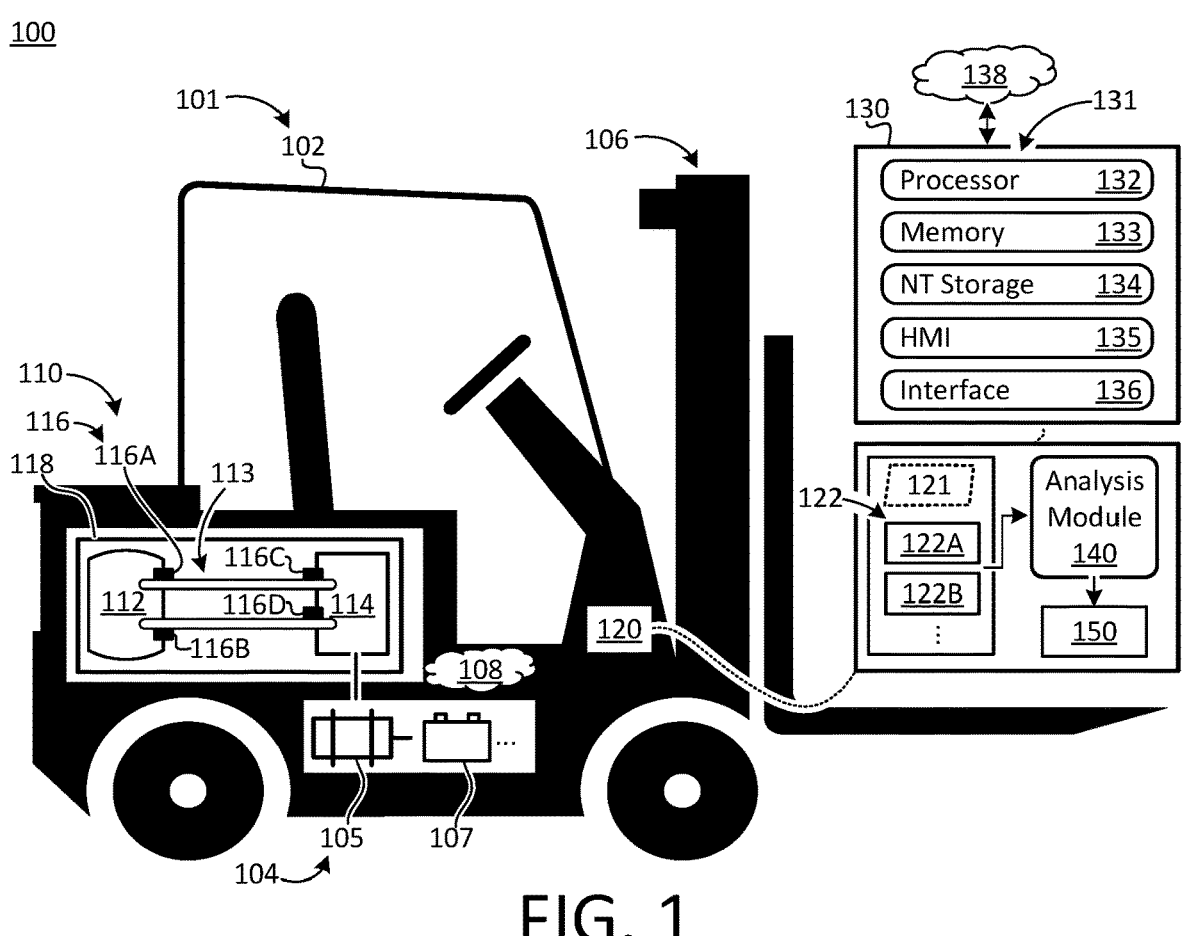
FIG. 1 illustrates an example operating environment in which aspects of the disclosure may be implemented.

FIG. 1 illustrates an example of an operating environment in which aspects of the disclosed technology for monitoring an FC may be implemented. The operating environment may comprise and/or correspond to a system 100 that includes a fuel cell (FC) machine 101. As used herein, an FC machine 101 may comprise or refer to any suitable machinery or equipment that comprises and/or can be powered by an FC, such as the FC system (FCS) 110 illustrated in FIG. 1. The FCS 110 may comprise fuel storage 112. The fuel storage 112 may comprise one or more fuel storage tanks, e.g., hydrogen fuel tanks or the like. The fuel storage 112 may be configured to supply fuel to an FC module 114 via, inter alia, a fuel coupling 113. The fuel coupling 113 may comprise any suitable means for controlling the flow of fuel from the fuel storage 112 to the FC module 114 and/or return flow from the FC module 114 back to the fuel storage 112. The fuel coupling 113 may comprise any suitable flow control means, including but not limited to connectors, pipes, tubing, lines, valves, conduit, gas lines, and/or the like. The FC module 114 may comprise one or more FCs, as disclosed herein. The FC module 114 may, for example, comprise one or more fuel cell stacks, each stack comprising a plurality of FC electrically coupled in series (individual FC not shown in FIG. 1 to avoid obscuring details of the illustrated examples).

In some implementations, the FC machine 101 and/or FCS 110 may comprise and/or be coupled to one or more fuel leak (FL) sensors 116. The FL sensors 116 may be configured to detect presence of the fuel(s) utilized by the FCS 110. More specifically, the FL sensors 116 may be configured to detect leakage of the substance(s) maintained within the fuel storage 112 and/or consumed by the FC module 114. The FL sensors 116 may be configured to detect the presence of hydrogen fuel ($H_2$) or the like. As disclosed herein, the FL sensors 116 may be disposed at locations where leaks are likely to occur. In the FIG. 1 example, the system 100 may comprise FL sensors 116A and 116B disposed at connections between the fuel coupling 113 and the fuel storage 112 and FL sensors 116C and 116D disposed at connections between the FC module 114 and the fuel coupling 113. The disclosure is not limited in this regard, however, and may be adapted to include any number of FL sensors 116 disposed at any suitable location(s) within the FC machine 101 and/or FCS 110. Alternatively, the system 100 may not include FL sensors 116 and, instead, may rely on other leak detection means, as disclosed herein.

In some implementations, the FCS 110 may comprise and/or be disposed within an enclosure 118. The enclosure 118 may comprise means for dispersing fuel and/or preventing fuel accumulation, as disclosed herein. In some implementations, the enclosure 118 may comprise ventilation means, which may include, but are not limited to: passive ventilation means (e.g., vents, openings, and/or other structures configured to prevent accumulation of fuel, to allow fuel to escape the enclosure 118 and/or FC machine 101, to promote airflow, and so on), active ventilation means (e.g., an airflow device or a fan), and/or the like. Although the ventilation means may mitigate risks associated with fuel accumulation, such means may reduce the efficacy of the FL sensors 116, as disclosed herein.

The FC machine 101 may comprise or refer to conveyance means, means for handling or processing loads, means for handling or processing materials, and/or the like. In the FIG. 1 example, the FC machine 101 may comprise or refer to a vehicle 102. As used herein, a vehicle 102 (or FC vehicle 102) may comprise or refer to any suitable means for conveyance that is powered, at least in part, by an FCS 110, including, but not limited to: a passenger convenance (a conveyance configured to hold one or more occupants, including an operator), a non-passenger conveyance, a load-handling conveyance, a material-handling conveyance, a forklift, a warehouse forklift, a side loader, a telehandler, an industrial forklift, a rough terrain forklift, a pallet jack, a high-capacity forklift, a walkie stacker, a reach for truck, a three-wheel stand forklift, a utility cart, an electric motor rider truck, an electric narrow aisle truck, an electric motor hand or hand-rider truck, an internal combustion truck, autonomous equipment (configured for autonomous operation), or the like. In the FIG. 1 example, the vehicle 102 may comprise a load-handling vehicle, such as a lift truck, forklift, or the like.

The FC module 114 may be configured to power the vehicle 102. As illustrated in FIG. 1, the FC module 114 of the vehicle 102 may be electrically coupled to a load 104. The load 104 may comprise and/or correspond to any suitable means for consuming electrical power produced by the FCS 110. The load 104 powered by the FCS 110 may include, but is not limited to, one or more of a drivetrain 105 of the vehicle 102 (one or more electrical motors mechanically coupled to one or more wheels of the vehicle 102), a load-manipulation device 106 of the vehicle 102 (e.g., a forklift or the like), an energy storage device 107 of the vehicle 102 (e.g., a battery), and/or the like.

The system 100 may further comprise a FC monitoring (FCM) module 120. As disclosed in further detail herein, the FCM module 120 may be configured to detect FC fuel leaks based, at least in part, on monitoring operation of the FCS 110, e.g., monitoring fuel consumption, power efficiency, and/or the like.

The FCM module 120 may be configured for operation on a device or apparatus. In the FIG. 1 example, aspects of the FCM module 120 may be implemented on an FCM device 130. Aspects of the FCM module 120 may be embodied and/or implemented by use of computing resources 131. The computing resources 131 may comprise any suitable computing means including, but not limited to a processor 132, memory 133, non-transitory (NT) storage 134, human-machine interface (HMI) resources 135, a data interface 136, and/or the like. The processor 132 may comprise any suitable processing means including, but not limited to: processing circuitry, logic circuitry, an integrated circuit (IC), a processor (single-core or multi-core), a processing unit, a physical processor, a virtual processor (e.g., a virtual machine), an arithmetic-logic unit (ALU), a central processing unit (CPU), a general-purpose processor, a programmable logic device (PLD), a field programmable gate array (FPGA), an application-specific integrated circuit (ASIC), a System on Chip (SoC), virtual processing resources, a multiprocessor system, a distributed processing system, and/or the like.

The memory 133 may comprise any suitable memory means including, but not limited to: volatile memory, non-volatile memory, random access memory (RAM), dynamic RAM (DRAM), synchronous DRAM (SDRAM), cache memory, or the like. The NT storage 134 may comprise any suitable non-transitory, persistent, and/or non-volatile storage means including, but not limited to a non-transitory storage device, a persistent storage device, an internal storage device, an external storage device, a remote storage device, Network Attached Storage (NAS) resources, a magnetic disk drive, a hard disk drive (HDD), a solid-state storage device (SSD), a Flash memory device, and/or the like. The HMI resources 135 may comprise any suitable means for human-machine interaction including, but not limited to an input device, an output device, an input/output (I/O)

device, a visual output device, a light emitting diode (LED), a display device, a monitor, a touch screen, a keyboard, a gesture input device, a mouse, a haptic feedback device, an audio output device, a neural interface device, and/or the like. In some implementations, the HMI resources 135 may comprise means for controlling the FC machine 101, vehicle 102, the load 104, the FCS 110, and/or the like.

The data interface 136 may comprise any suitable data communication and/or interface means including, but not limited to a communication interface, a I/O interface, a network interface, an electronic communication network interface, an interconnect, and/or the like. In some implementations, the data interface 136 may be configured for electronic communication via an external network 138, which may include, but is not limited to one or more of an Internet Protocol (IP) network, a wired network, a wireless network (e.g., IEEE 802.11a-n wireless network, Bluetooth® network, Near-Field Communication (NFC) network, and/or the like), a Local Area Network (LAN), a Wide Area Network (WAN), a Virtual Private Network (VPN), and/or the like.

In some implementations, the data interface 136 may be configured to communicatively and/or operatively couple the FCM module 120 to components of the FC machine 101 and/or vehicle 102, such as the FCS 110, fuel storage 112, FC module 114, and so on. The data interface 136 may comprise and/or be configured to couple the FCM module 120 to an internal network 108 of the FC machine 101, such as a controller area network (CAN) or the like.

The FCM module 120 may be configured to detect fuel leak conditions by, inter alia, monitoring a plurality of FC metrics 122. The FC metrics 122 may comprise related FC metrics 122 pertaining to the same FC characteristic and/or feature (FCCF) 121 of the FCS 110. As used herein, an FCCF 121 may refer to any information configured to characterize the operational behavior and/or performance of the FCS 110. By way of non-limiting example, an FCCF 121 may include, but is not limited to: fuel utilization by the FCS 110 and/or respective FC, power output by the FCS 110 and/or respective FC, efficiency of the FCS 110 and/or respective FC, and/or the like.

As disclosed above, the FCM module 120 may be configured to track a plurality of related FC metrics 122 that are configured to track the same FCCF 121 using different techniques, methods, and/or different types of data. As illustrated in FIG. 1, the FCM module 120 may be configured to track a first FC metric 122A. The first FC metric 122A may comprise, incorporate, and/or be derived from "direct" measurement data and/or "direct" measurements of the FCCF 121. As used herein, "direct" measurement data pertaining to an FCCF 121 may comprise and/or refer to measurement data that pertains to, quantifies and/or measures the FCCF 121 itself. For example, direct measurements of a fuel consumption FCCF 121 may comprise actual of the fuel consumed by the FCS 110, measurements acquired from the fuel storage 112 (e.g., measurements of a remaining fuel capacity), and/or the like. An FC metric 122 derived from direct measurement data, such as the first FC metric 122A may comprise and/or be referred to as a "direct," "actual," or "measured" FC metric 122.

The FCM module 120 may be further configured to track a second FC metric 122B. The second FC metric 122B may comprise, incorporate, and/or be derived from "indirect" measurement data pertaining to the FCCF 121. As used herein, "indirect" measurement data may comprise and/or refer to data that does not directly measure and/or quantify the FCCF 121. Indirect measurement data may comprise and/or refer to data having a defined relationship to the FCCF 121, e.g., a defined mathematical relationship, such as a relationship between fuel consumption by the FCS 110 and power output of the FCS 110, or the like. In some implementations, the indirect measurement data may have a defined physical relationship to the FCCF 121. For example, the indirect measurement data may comprise power output measurements having a defined physical relationship to fuel consumption by the FCS 110 (e.g., per power efficiency data determined for the FCS 110, as disclosed in further detail herein). The second FC metric 122B may be inferred, predicted, expected, calculated, estimated, and/or otherwise determined based, at least in part, on indirect measurement data pertaining to the FCCF 121. The second FC metric 122 may, therefore, comprise and/or be referred to as an "indirect," "inferred," "predicted," "expected," and/or "estimated" FC metric 122.

The FCM module 120 may further comprise and/or be coupled to an analysis module 140. The analysis module 140 may be configured to detect leak condition(s) based, at least in part, on the FC metrics 122 acquired by the FCM module 120 (e.g., FC metrics 122A and 122B). The analysis module 140 may be configured to determine whether the related FC metrics 122 are indicative of anomalous operation of the FCS 110, e.g., operation under fuel leak conditions. In some implementations, the analysis module 140 may be configured to detect anomalous operation of the FCS 110 based, at least in part, on an error, difference, deviation, comparison and/or other analysis of the related FC metrics 122. For example, the analysis module 140 may detect fuel leak condition(s) in response to the expected FC metric 122B deviating from the measured FC metric 122A by more than a threshold. Alternatively, or in addition, the FCM module 120 may be configured to detect leak conditions by use of artificial intelligence, machine learned and/or machine learning (AI/ML) components, as disclosed in further detail herein.

The analysis module 140 may be configured to indicate detection of an anomaly (e.g., a fuel leak condition) using any suitable technique. In the FIG. 1 example, the FCM module 120 may be configured to produce an anomaly detection (AD) output 150 in response to the related FC metrics 122. The AD output 150 may be configured to indicate whether the related FC metrics 122 are indicative of a fuel leak condition. For example, the analysis module 140 may produce an AD output 150 of "1" or other suitable value (and/or AI/ML label) to indicate detection of an anomaly and "0" otherwise. Alternatively, the AD output 150 may be configured to indicate a likelihood, probability, or prediction that the related FC metrics 122 are indicative of anomalous operation of the FCS 110. By way of non-limiting example, the analysis module 140 may be configured to produce AD output 150 that quantify a degree to which the related FC metrics 122 are indicative of a leak condition, e.g., may quantify a degree to which the expected FC metric 122B conforms to (and/or deviates from) the measured FC metric 122A. The analysis module 140 may be configured to produce AD outputs 150 within a range (e.g., from 0 to 1), with higher values indicating a higher probability of a leak condition (or vice versa).

Figure 2A:
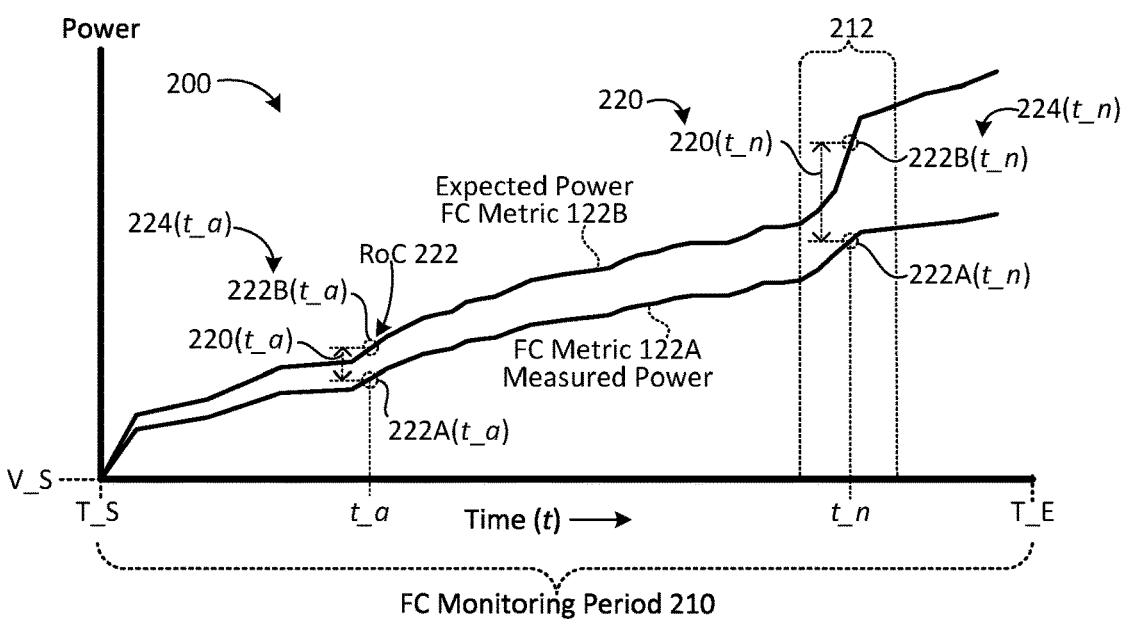
FIG. 2A illustrates examples of related fuel cell metrics configured for fuel leak detection, as disclosed herein.

FIG. 2A includes a plot 200 illustrating examples of related FC metrics 122, as disclosed herein. In the FIG. 2A example, the FCM module 120 may be configured to monitor a plurality of related FC metrics 122, each configured to quantify the cumulative power output of the FCS 110. The FCM module 120 may be configured to track a first FC metric 122A and a second FC metric 122B, each configured to track the cumulative power FCCF 121 of the FCS 110. The FCM module 120 may be configured to track the FCCF 121 over a designated period, e.g., an FC monitoring (FCM) period 210. As used herein, an FCM period 210 may refer to any suitable quantum of time, such as a time period (e.g., an operating period of the FCS 110), a time window, a time interval (e.g., an operating interval of the FCS 110), a cycle, an operating cycle, a fueling cycle, and/or the like. In some implementations, the FCM period 210 may be fixed (e.g., may correspond to a day, week, or other suitable period). Alternatively, or in addition, aspects of the FCM period may be event-based. The FCM period 210 may be configured in accordance with the FCCF 121. In the FIG. 2A example, the FCCF 121 pertains to cumulative power generated by the FCS 110 and, as such, the FCM period 210 may correspond to a fuel cycle of the FCS 110. As used herein, a "fuel cycle" may refer to a time between fuel (or refuel) operations. As illustrated in FIG. 2A, the start time ($T_S$) of the FCM period 210 may correspond to a fill time of the fuel storage 112 of the FCS 110 (e.g., the last or most recent fill time) and the end time (TE) of the FCM period 210 may correspond to a time at which the fuel storage 112 is exhausted and/or the fuel storage 112 is refilled.

The first FC metric 122A of the FIG. 1 example may comprise and/or be derived from direct measurements of power generated by the FCS 110. The first FC metric 122A may comprise, incorporate, and/or be derived by, inter alia, monitoring power generated by the FCS 110 (e.g., monitoring power, current, voltage, and/or other quantities on one or more output terminals of the FCS 110), monitoring power consumed by the load 104 coupled to the FCS 110, monitoring signals on the internal network 108 of the FC machine 101 and/or vehicle 102 (e.g., filtering CAN signals pertaining to power generation by the FCS 110 and/or power consumption by the load 104), and/or the like.

The second FC metric 122B may be inferred, predicted, expected, calculated, estimated, and/or otherwise determined from other types of data, e.g., indirect measurements, as disclosed herein, which may include, but are not limited to: fuel consumed by the FCS 110 and/or respective FC (e.g., monitoring utilization of the fuel storage 112 by the FCS 110), fuel input to the FCS 110 and/or respective FC (e.g., monitoring the flow of fuel to/from the FCS 110), filtering signals on the internal network 108 of the FC machine 101 and/or vehicle 102 (e.g., operator control inputs, a fuel gauge, or other HMI components), and/or the like. The second FC metric 122B may indicate the amount of power the FCS 110 is expected to generate based on the amount of fuel consumed by the FCS 110. In some implementations, the second FC metric 122B may be estimated by use of a power efficiency map determined for the FCS 110, as disclosed in further detail herein.

Although particular examples of related FC metrics 122 pertaining to particular FCCF 121 are described herein, the disclosure is not limited in this regard and could be adapted to track related FC metrics 122 pertaining to any suitable FCCF 121. Moreover, the related FC metrics 122 may include measured FC metrics 122A that comprise, incorporate, and/or are derived from any suitable direct measurements of the FCCF 121 and expected FC metrics 122B based on any suitable indirect measurements.

Plot 200 of FIG. 2A illustrates examples of the FC metrics 122A and 122B over an example FCM period 210 (e.g., from a fill time at $T_S$ to an empty or re-fill time at TE). At the start time ($T_S$), both FC metrics 122A and 122B may be initialized and/or set to the same initial or start value (V_S). In the FIG. 2A example, the initial value (V_S) may indicate the cumulative amount of power generated by the FCS 110 at the start of the FCM period 210, which may be zero.

As illustrated in FIG. 2A, the FC metrics 122A and 122B deviate over the FCM period 210. In other words, the FC metrics 122A and 122B may comprise different cumulative power values over the course of the FCM period 210. As illustrated, the measured cumulative power output of the FCS 110 (e.g., the first FC metric 122A) may be lower than the expected power output (e.g., the second FC metric 122B). This deviation may be caused by a number of different factors, including fuel leak conditions. Other potential causes of such deviation may include, but are not limited to: FC inefficiency, operating conditions of the FCS 110 (e.g., ambient temperature), operator behavior (e.g., power requirements), and so on. The analysis module 140 may be configured to distinguish deviations caused by fuel leak conditions from deviations caused by other, benign factors.

The analysis module 140 may be configured to detect FCS anomalies by use of any suitable method or technique. In some implementations, the analysis module 140 may be configured to implement numerical, rules-based, and/or heuristic analysis.

In a first non-limiting example, the analysis module 140 may be configured to implement a deviation analysis. The deviation analysis may comprise evaluating an FC deviation metric 220 determined for the related FC metrics 122A and 122B. As used herein, an FC deviation (FCD) metric 220 may comprise and/or refer to an error, difference, deviation, and/or other comparative analysis metric pertaining to related FC metrics 122. The analysis module 140 may be configured to determine and/or evaluate FCD metrics 220 at respective times during the FCM period 210 (and/or over time). In the FIG. 2A example, the FCD metric 220 may comprise a difference between FC metrics 122A and 122B at respective times (e.g., FCD metric 220$(t)$=|122A(t)−122B (t)|). FIG. 2A illustrates examples of FCD metrics 220; 220$(T_\alpha)$ indicates a difference between the FC metrics 122A and 122B at time $T_\alpha$, 220$(T_n)$ indicates a difference at time $T_n$, and so on.

As shown in FIG. 2A, in some implementations, the FCD metric 220 may be cumulative. For example, the FCD metric 220 observed at later times (e.g., t_n) may incorporate differences observed at earlier times of the FCM period 210 (e.g., $t_\alpha$). Therefore, the magnitude of the FCD metric 220 at respective times (t) may be due, at least in part, to cumulative, incremental deviation, in addition to potential fuel leak condition(s). In some implementations, the analysis module 140 may be configured to compensate for these types of cumulative differences and/or deviation (e.g., implement a normalized deviation analysis). For example, the deviation analysis may further comprise normalizing the FC metrics 122 and/or the resulting FCD metric 220. For example, the analysis module 140 may be configured to compensate and/or normalize the FCD metric 220 determined respective times (t) by, inter alia, subtracting previously accumulated deviation such that the FCD metric 220 at time to is determined as follows:

$$220(t_n) = (|122A(t_n) - 122B(t_n)|) - \sum_{t_S}^{t_n-1} 220(t)$$

The analysis module 140 may detect a potential leak condition in response to determining that the FCD metric 220 exceeds an FC deviation threshold ($T_{FC\_Dev}$), e.g., detect an anomaly at time t if 220$(t) \geq T_{Diff}$. The FC deviation threshold ($T_{FC\_Dev}$) may be set according to testing and experience. Alternatively, or in addition, the FC deviation threshold ($T_{FC\_Dev}$) may be learned and/or inferred by AI/ML components of the analysis module 140, as disclosed in further detail herein.

Alternatively, or in addition, in a second non-limiting example, the analysis module 140 may be configured to implement a "rate of change" analysis of the related FC metrics 122. As used herein, the "rate of change" of an FC metric 122 (RoC 222 or FC RoC 222) may refer to a slope, derivative, change rate, and/or other quantity configured to characterize change in the FC metric 122 as a function of time (e.g., $\Delta FC$ Metric 122$/\Delta t$) The RoC 222 of an FC metric 122 may be determined by any suitable technique, including, but not limited to: a derivative, a continuous derivative (e.g., tracking and/or modeling the FC metric 122 as a continuous function, such as a quadratic spline, exponential, and/or the like), a pseudo-continuous derivative, a locally continuous derivative, a piecewise continuous derivative, a discrete derivative (e.g., a difference quotient), numerical differentiation, and/or the like. The analysis module 140 may be configured to compare the RoC 222 of related FC metrics 122 at respective times (t) of the FCM period 210. The analysis module 140 may detect a leak condition at time tin response to determining that a difference between the FC RoC 222A and 222B (e.g., $\Delta RoC$) satisfies an FC RoC threshold ($T_{FC\_RoC}$), e.g., detect an anomaly at time t per |222B(t)−222A(t)|$\geq T_{FC\_RoC}$ and/or as follows:

$$\left| \frac{\Delta 122B(t)}{\Delta t} - \frac{\Delta 122A(t)}{\Delta t} \right| \geq T_{FC\_RoC}$$

The FC RoC threshold ($T_{FC\_RoC}$) may be set according to testing and experience. Alternatively, or in addition, the FC RoC threshold ($T_{FC\_RoC}$) may be learned and/or inferred by AI/ML components of the analysis module 140, as disclosed herein.

Figure 2B:
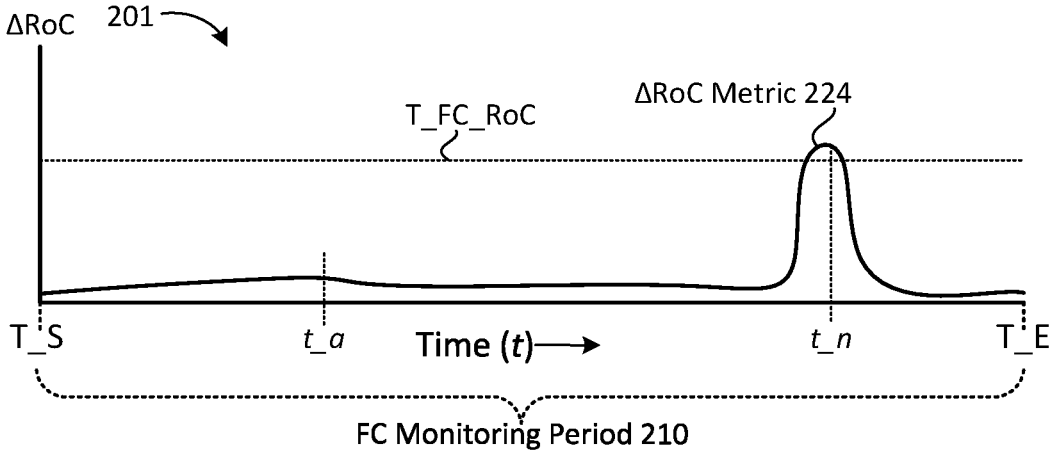
FIG. 2B illustrates examples of fuel leak detection based on analysis of the rate of change of related fuel cell metrics.

FIG. 2A illustrates examples of FC RoC 222, e.g., RoC 222 of related FC metrics 122). The RoC analysis implemented by the FCM module 120 at respective times (t) may comprise comparing the RoC 222 of the related FC metrics 122. In some implementations, the analysis module 140 may be configured to determine and/or evaluate $\Delta RoC$ metrics 224 over the FC monitoring period 210, as illustrated in FIG. 2B. The $\Delta RoC$ metrics 224 illustrated in the FIG. 2B example may comprise an error, deviation, difference, and/or other comparative analysis between related RoC 222 (e.g., RoC 222A and 222B of the related FC metrics 122 of FIG. 2A). In plot 201 of FIG. 2B, however, the $\Delta RoC$ metrics 224 may be upscaled to better illustrate aspects of the disclosed examples.

The RoC analysis implemented by the FCM module 120 may comprise determining $\Delta RoC$ metrics 224$(t)$ at respective times (t) of the FC monitoring period 210, as disclosed above, e.g., the $\Delta RoC$ metric 224 at time t may be expressed as |$\Delta$122A(t)$/\Delta t$−$\Delta$122B(t)$/\Delta t$|. Alternatively, or in addition, the analysis module 140 may be configured to derive a continuous and/or pseudo-continuous $\Delta RoC$ metric 224, as follows: $\Delta RoC(t)=|\partial f_{122B}/\partial t - \partial f_{122A}/\partial t|$, where $f_{122A}$ and $f_{122B}$ are functions configured to model the related FC metrics 122A and 122B, respectively (e.g., model the FC metrics 122 as continuous functions, pseudo-continuous functions, piecewise continuous functions, or the like). The analysis module 140 may be configured to detect a fuel leak condition in response to ΔRoC metric 224 exceeding the FC RoC threshold (T_{FC_RoC}), as disclosed herein.

Referring to FIGS. 2A and 2B, the RoC analysis implemented by the analysis module 140 at time ta may comprise determining an ΔRoC metric 224(t_α), as disclosed here, e.g., $\Delta RoC(t_\alpha)=|(RoC222A(t_\alpha)-(RoC222B(t_\alpha)|$, $\Delta RoC(t_\alpha)=|\Delta 122A(t_\alpha)/\Delta t-\Delta 122B(t_\alpha)/\Delta t|$, $\Delta RoC(t_\alpha)=|\partial f_{122B}/\partial t-\partial f_{122A}/\partial t|$, and/or the like. As illustrated in FIGS. 2A and 2B, RoC 222A and RoC 222B are similar at time ta (e.g., the FC metrics 122A and 122B exhibit a similar change rage) resulting in a relatively low ΔRoC metric 224(t_α). As such, the analysis module 140 may not detect a fuel leak condition at time t_α, despite the deviation exhibited between the FC metrics 122A and 122B at time ta (shown as 220(t_α) in plot 200 of FIG. 2A).

The RoC analysis implemented by the analysis module 140 at time to may comprise determining an ΔRoC metric 224(t), as disclosed herein, e.g., $\Delta RoC(t_n)=|(RoC\ 222A(t_n)-(RoC\ 222B(t_n)|$, $\Delta RoC(t_n)=|\Delta 122A(t_n)/\Delta t-\Delta 122B(t_n)/\Delta t|$, $\Delta RoC(t_n)=|\partial f_{122B}/\partial t-\partial f_{122A}/\partial t|$, and/or the like. As shown in the examples illustrated in FIGS. 2A and 2B, the RoC 222B of the expected FC metric 122B exhibits higher deviation from the RoC 222A of the measured FC metric 122A at time t_n, resulting in a higher ΔRoC metric 224(t_n). Accordingly, the analysis module 140 may detect a fuel leak condition at time t_n, e.g., based on determining that ΔRoC (t_n)>T_{FC_RoC}, as illustrated in the FIG. 2B example.

Figure 2C:
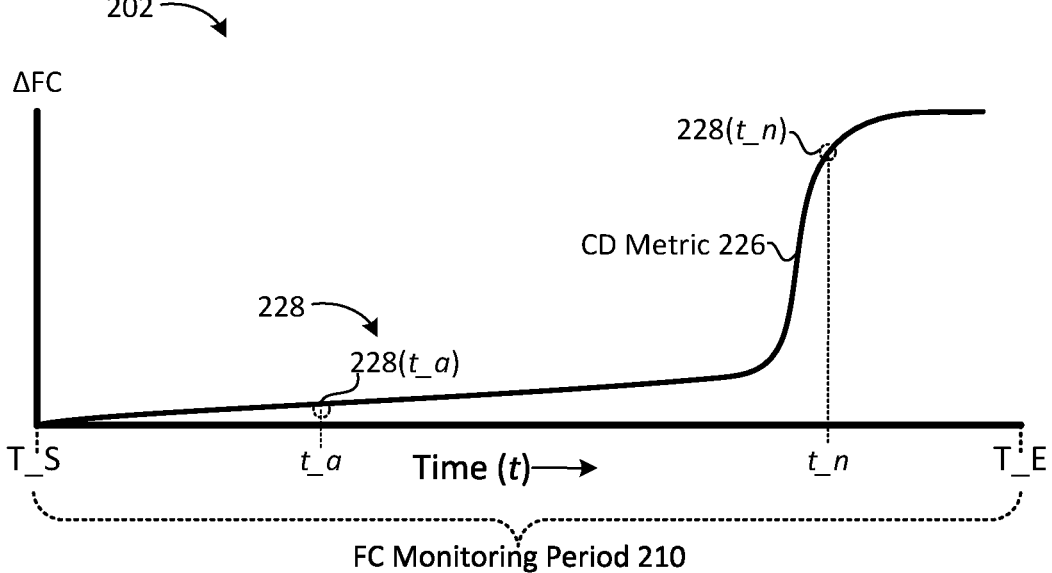
FIG. 2C illustrates examples of cumulative deviation between related fuel cell metrics.

Alternatively, or in addition, in third non-limiting examples, the analysis module may be configured to implement a cumulative FC deviation (CFCD) analysis. The CFCD analysis may comprise evaluating aspects of a cumulative deviation between the related FC metrics 122A and 122B. FIG. 2C comprises a plot 202 illustrating an example of a cumulative deviation (CD) metric 226. The CD metric 226 may comprise and/or be derived from FCD metrics 220 determined over the FCM period 210. For example, the CD metric 226 at respective times (t) may comprise and/or be derived from the uncompensated or un-normalized FCD metric 220, as disclosed above with respect to the first non-limiting example. Alternatively, the CD metric 226 may comprise and/or be derived from normalized FCD metrics 220; for example, the CD metric 226 at time to may be derived from normalized FCD metrics 220, as follows (in discrete and continuous form):

$$CD \text{ metric } 221(t_n) = \sum_{t=T_S}^{t_n} FCD \text{ metric } 220(t)$$

$$CD \text{ metric } 221(t_n) = \int_{T_S}^{t_n} FCD \text{ metric } 220(t)$$

The CD metric 226 illustrated in plot 202 of FIG. 2C may correspond to the FC metrics 122A and 122B of FIG. 2A. In FIG. 2C, however, the CD metric 226 is upscaled to better illustrate aspects of the disclosed examples. The CFC analysis may comprise evaluating a RoC of the CD metric 226, e.g., may comprise determining and/or evaluating a CD RoC 228 at respective times (t). The CD RoC 228 may be determined by any suitable technique, as disclosed herein, e.g., may comprise a derivative of the CD metric 226, a continuous derivative, a pseudo-continuous derivative, a locally continuous derivative, a piecewise continuous derivative, a discrete derivative (e.g., a difference quotient), numerical differentiation, and/or the like. The analysis module 140 may be configured to detect a fuel leak condition at time t in response to the CD RoC 228(t) exceeding a CD RoC threshold (T_{CD_ROC}). The CD RoC threshold (T_{CD_RoC}) may be set according to testing and experience. Alternatively, or in addition, the CD RoC threshold (T_{CD_RoC}) may be learned and/or inferred by AI/ML components of the analysis module 140, as disclosed herein.

In some implementations, the analysis module 140 may be configured to implement window-based analysis of the related FC metrics 122. More specifically, the analysis module 140 may be configured to implement aspects of the techniques disclosed herein within respective windows 212 of the FCM period 210, as illustrated in FIG. 2A. As used herein, an analysis window (or window 212) may comprise and/or refer to any suitable range, set, and/or extent of the FCM period 210 and/or multiple FCM periods 210. In some implementations, the analysis module 140 may be configured to utilize windows 212 of width W. FIG. 2A illustrates an example of a window 212 that is centered at time to and spans from t_n−W/2 to t_n+W/2.

Window-based RoC analysis may comprise determining the RoC 222A and 222B of the FC metrics 122A and 122B within a window 212 and evaluating differences between the RoC 222A and 222B at respective times within the window 212. The RoC 222 of an FC metric 122 within the window 212 may be determined by any suitable method, as disclosed herein (e.g., derivative, numerical analysis, and/or the like). The window-based analysis may comprise comparing an average, mean, maximum, and/or minimum ΔRoC metric 224 within the window 212 to a threshold (e.g., T_{FC_RoC}). Alternatively, or in addition, the window-based analysis may comprise determining a cumulative ΔRoC between the FC metrics 122A and 122B within the window 212 and, inter alia, comparing the cumulative ΔRoC to a suitable threshold, e.g., a window-based ΔRoC threshold (T_{W_Roc}).

Although particular examples of techniques for analyzing related FC metrics 122 for fuel leak detection are described herein, the disclosure is not limited in this regard and could be adapted to implement any suitable numerical, rules-based, and/or heuristic analysis method or technique. Alternatively, or in addition, in some implementations, the analysis module 140 may comprise AI/ML components configured to infer and/or learn to distinguish deviations caused by leak conditions, as disclosed in further detail herein. For example, the analysis module may comprise AI/ML components configured to learn and/or refine one or more of the thresholds disclosed herein, e.g., one or more of an FC deviation threshold (T_{FC_Dev}), FC RoC threshold (T_{FC_Roc}), CD RoC threshold (T_{CD_RoC}), and/or the like.

Figure 3:
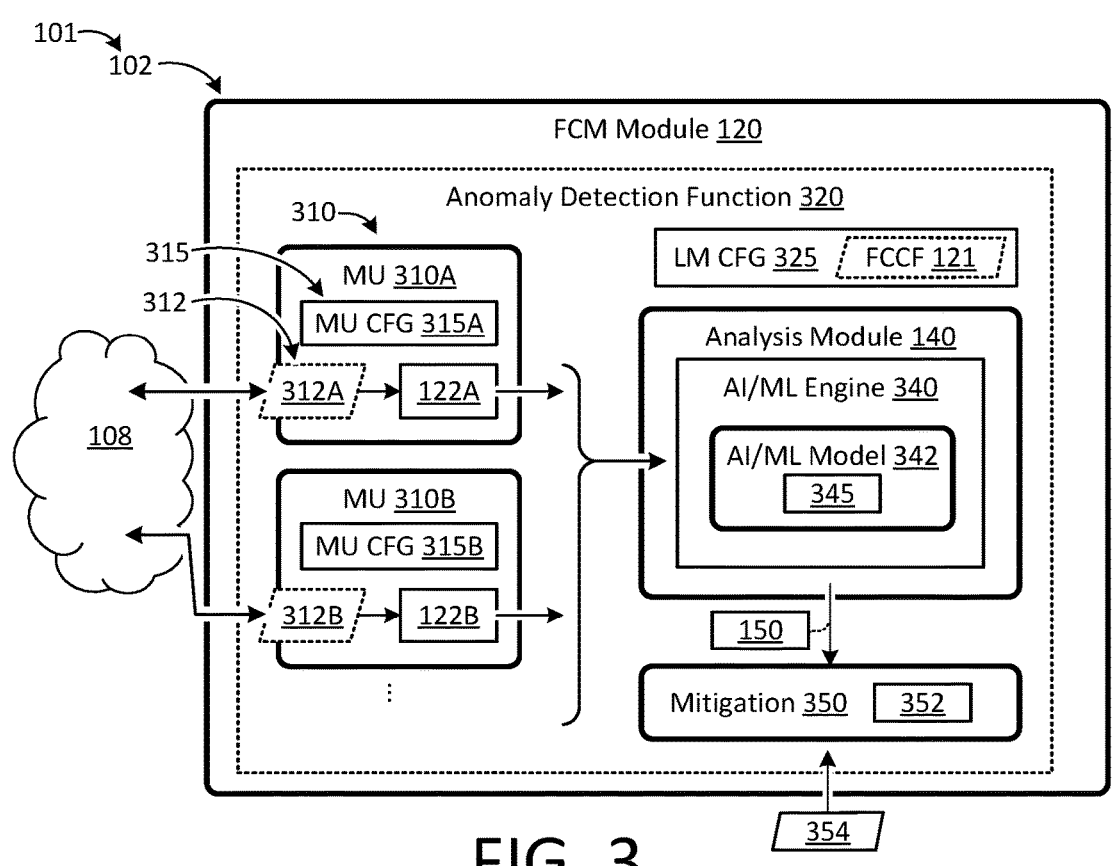
FIG. 3 is a schematic block diagram illustrating an example of a fuel cell monitoring module.

FIG. 3 is a schematic block diagram illustrating another example of an FCM module 120. The FCM module 120 may be configured to implement an anomaly detection (AD) function 320, which may comprise, but is not limited to: a) acquiring FCM data 312 pertaining to an FCCF 121, b) tracking a plurality of related FC metrics 122 by use of the acquired FCM data 312, and c) determining whether the related FC metrics 122 are indicative of a fuel leak condition. Acquiring the FCM data 312 may comprise acquiring first FCM data 312A and second FCM data 312B. The first FCM data 312A may comprise first measurement data that directly relates to the FCCF 121, e.g., direct measurements and/or measurement data, as disclosed herein. The first FC metric 122A may be derived from the direct measurements of the first FCM data 312A. The second FCM data 312B may comprise second measurement data that indirectly relates to the FCCF 121, e.g., indirect measurements and/or measurement data, as disclosed herein. The second FC metric 122B may be derived from the indirect measurements of the second FCM data 312B, e.g., may be inferred, predicted, expected, calculated, estimated, and/or the like. The first FC metric 122A may, therefore, comprise direct or measured values of the FCCF 121 and the second FC metric 122B may comprise and indirect or expected value of the FCCF 121. The determination of whether the related FC metrics 122A and 122B are indicative of a fuel leak may be based, at least in part, on one or more of an error, difference, deviation, comparison, artificial intelligence analysis, machine-learned analysis, and/or other analysis of the related FC metrics 122, as disclosed herein.

The FCM module 120 may acquire the FCM data 312 by any suitable means or technique. In some implementations, the FCM module 120 may be configured to acquire FCM data 312 from an internal network 108 of the FC machine 101 and/or vehicle 102, such as a control network, controller network, a CAN or the like. Alternatively, or in addition, the FCM module 120 may acquire aspects of the FCM data 312 from components of the FC machine 101, vehicle 102, FCS 110, and/or the like. For example, the FCM module 120 may be operatively and/or communicatively coupled to one or more such components. The FCM module 120 may be configured to acquire data from and/or by use of any suitable component(s) or device(s) including, but not limited to: sensors, actuators, controllers, a machine control system, a vehicle control system, HMI resources 135, networks (e.g., an internal network 108, an external network 138, and/or the like), speed controllers, motor controllers, FC controllers, a controller of the FCS 110, intelligent electronic devices (IED), flow controllers, valve controllers, flow sensors, temperature sensors, mass sensors, power measurement devices, current measurement devices (e.g., current transformers), voltage sensors, and/or the like.

In some implementations, the FCM module 120 may be configured to implement aspects of the AD function 320 in accordance with a leak monitoring configuration data and/or a leak monitoring configuration (LM CFG) 325. The LM CFG 325 may comprise any suitable information pertaining to implementation of the AD function 320. For example, the LM CFG 325 may specify the FCCF 121 to be tracked by the plurality of related FC metrics 122, may specify FCM data 312 to acquire for respective FC metrics 122, define how respective FC metrics 122 are to be derived (e.g., define mathematical relationships between respective FC metrics 122 and the acquired FCM data 312), and so on. The LM CFG 325 may be implemented and/or embodied in any suitable non-transitory (NT) form, which may include, but is not limited to: instructions stored on a NT machine-readable medium, firmware, configuration data, logic, circuitry, logic circuitry, and/or the like.

In the FIG. 3 example, the FCM module 120 may comprise and/or be coupled to a plurality of monitoring units 310, each monitoring unit (MU) 310 configured to track a respective FC metric 122 pertaining to a designated FCCF 121 (e.g., per the LM CFG 325). The MU 310 may be configured to a) periodically (and/or continuously) acquire FCM data 312 and b) derive a respective FC metric 122 from the acquired FCM data 312.

In some implementations, the MU 310 may be configured to operate in accordance with respective MU configuration data and/or a respective MU configuration (MU CFG 315). As used herein, an MU CFG 315 may comprise and/or refer to any suitable information adapted to configure an MU 310 (and/or FCM module 120) to track a specified FC metric 122 pertaining to the FCCF 121. For example, the MU CFG 315 for a specified FC metric 122 may be adapted to configure the corresponding MU 310 to: a) acquire suitable FCM data 312 and b) derive the FC metric 122 from the acquired FCM data 312. For example, the MU CFG 315 may specify the type(s) of FCM data 312 to be acquired by the MU 310, identify component(s) from which the FCM data 312 is to be acquired, define acquisition parameters for the FCM data 312 (e.g., specify an acquisition period, rate, resolution, and/or the like), define how the FC metric 122 is to be derived from the acquired FCM data 312 (e.g., define a mathematical relationship between the FCM data 312 and the FC metric 122), and so on. In some implementations, aspects of the MU CFG 315 may comprise and/or be embodied by the LM CFG 325 of the FCM module 120. Alternatively, or in addition, aspects of the MU CFG 315 may be maintained separately, e.g., may comprise and/or be embodied in a suitable NT form, such as instructions stored on a NT machine-readable medium, firmware, configuration data, logic, circuitry, logic circuitry, and/or the like.

In the FIG. 3 example, the first MU 310A may be configured to track a first FC metric 122A, as disclosed herein. The first MU 310A may be configured to periodically (and/or continuously) acquire first FCM data 312A, the first FCM data 312A comprising measurements that are directly related to the FCCF 121. The first MU 310A may be further configured to periodically (and/or continuously) track the first FC metric 122A, the first FC metric 122A comprising, incorporating, and/or derived from the first FCM data 312A. The second MU 310B may be configured to periodically (and/or continuously) acquire second FCM data 312B, the second FCM data 312B different from the first FCM data 312A. The second FCM data 312B may comprise measurement data that are indirectly related to the FCCF 121 (e.g., may comprise data having a defined correlational relationship to the FCCF 121, as disclosed herein). The second MU 310B may be further configured to periodically (and/or continuously) track the second FC metric 122B, which may comprise inferring, predicting, expecting, and/or estimating the FCCF 121 from indirect measurement data of the second FCM data 312B.

The analysis module 140 may be configured to determine whether the related FC metrics 122 acquired by the FCM module 120 are indicative of anomalous operation of the FCS 110 and produce a corresponding AD output 150, as disclosed herein. The determination may be based, at least in part, an error, difference, deviation, comparison and/or other analysis of the first FC metric 122A and the second FC metric 122B. The analysis module 140 may be configured to detect fuel leak condition(s) through one or more of: deviation analysis (e.g., evaluating a deviation between the related FC metrics 122A and 122B) as in the first non-limiting examples disclosed above, RoC analysis (e.g., analyzing the RoC 222 and/or ΔRoC metrics 224 of the FC metrics 122A and 122B) as in the second non-limiting examples disclosed above, CD analysis (e.g., analyzing a CD metric 226 indicative of a cumulative error, deviation, and/or difference between the related FC metrics 122A and 122B and/or a CD RoC 228) as in the third non-limiting examples disclosed above, window-based analysis, and/or the like.

Alternatively, or in addition, the analysis module 140 may be configured to detect fuel leak condition(s) by use of AI/ML components. In the FIG. 3 example, the analysis module 140 may comprise and/or be coupled to an AI/ML engine 340. The AI/ML engine 340 may comprise and/or implement any suitable AI/ML means, including, but not limited to a supervised learning AI/ML architecture, an unsupervised AI/ML architecture, a reinforcement AI/ML architecture, a deep learning AI/ML architecture, an AI/ML classifier, an artificial neural network (ANN), a convolutional neural network (CNN), a recurrent or recursive neural network (RNN), an AI/ML sorting architecture, an AI/ML clustering architecture, an instance based AI/ML architecture, a generative model, and/or the like.

In some implementations, the AI/ML engine 340 may comprise and/or be coupled to an AI/ML model 342. The AI/ML model 342 may be trained to identify related FC metrics 122 that are indicative of anomalous operation of the FCS 110 (e.g., operation under fuel leak conditions) and/or distinguish anomalous operation of the FCS 110 from non-anomalous operation, as disclosed herein. The AI/ML model 342 may learn such distinctions through a suitable AI/ML technique, as disclosed herein. As disclosed in further detail herein, the AI/ML model 342 may be implemented and/or configured in accordance with learned AI/ML configuration data (an AI/ML CFG 345). Aspects of the AI/ML CFG 345 may be implemented and/or embodied by the LM CFG 325. Alternatively, or in addition, aspects of the AI/ML CFG 345 may be implemented and/or embodied separately, e.g., in a hardware, firmware, and/or software implementation of the AI/ML engine 340 and/or AI/ML model 342.

The AI/ML model 342 may be configured to implement aspects of the AD function 320. In some implementations, the AI/ML model 342 may be configured to produce an AD output 150 in response to related FC metrics 122 acquired by the FCM module 120. The AD output 150 may comprise a label predicted for the related FC metrics 122, e.g., predict an "anomalous" label corresponding to detection of a fuel leak condition, a "non-anomalous" label for non-leak operation, and/or the like. Alternatively, or in addition, the AI/ML model 342 may be configured to produce AD outputs 150 indicating a degree to which the related FC metrics 122 are indicative of anomalous operation of the FCS 110.

In some implementations, the FCM module 120 may further comprise and/or be coupled to a mitigation module 350. The mitigation module 350 may be configured to, inter alia, implement one or more mitigation actions 352 in response to detection of fuel leak conditions, e.g., as indicated by the AD output 150 produced by the analysis module 140. The mitigation actions 352 may include, but are not limited to: alerting an operator of the FC machine 101 (and/or vehicle 102) of the detected leak, displaying information pertaining to the detected anomaly on HMI resources 135 of the FC machine 101, transmitting alert notifications to component(s) of the FC machine 101 through the internal network 108, transmitting alert notifications through the external network 138 (e.g., transmitting alert notifications to maintenance personnel, management personnel, and/or the like), and so on. In some implementations, the mitigation actions 352 may include controlling selected component(s) of the FC machine 101 and/or FCS 110, such as: disabling operation of the FCS 110, closing output(s) of the fuel storage 112 (e.g., closing one or more output valves), closing input value(s) to the FCS 110, and so on.

In some implementations, the mitigation module 350 may be configured to maintain the FCS 110 in a disabled state until a mitigation message 354 is received. The mitigation message 354 may be received through any suitable electronic communication means, including, but not limited to: an electronic communication network (e.g., the internal network 108, external network 138, or the like), HMI resources 135 of the FCM device 130 and/or FC machine 101, operator control inputs, and/or the like.

The mitigation message 354 may comprise information indicating whether the potential fuel leak condition detected by the FCM module 120 has been mitigated. The mitigation message 354 may comprise feedback data indicating whether a fuel leak condition was identified, e.g., the mitigation message 354 may indicate whether the AD output 150 was a false positive. The mitigation module 350 may provide feedback data to the analysis module 140. The AI/ML engine 340 may utilize the feedback data to, inter alia, refine and/or train the AI/ML model 342. For example, if the mitigation message 354 indicates that the AD output 150 was a false positive, the AI/ML engine 340 may update the AI/ML model 342 to prevent subsequent false positives in response to similar FC metrics 122. Conversely, if the feedback data indicates that a fuel leak condition was identified, the AI/ML engine 340 may update the AI/ML model 342 to reinforce the AD output 150, e.g., ensure that anomalies are detected for similar FC metrics 122.

Although examples of techniques for analyzing particular types of related FC metrics 122 as described herein, the disclosure is not limited in this regard and could be adapted to apply the disclosed techniques to any suitable FC metrics pertaining to any suitable FCCF 121. For example, FIG. 4 is a schematic block diagram illustrating an example of an FCM module 120 configured to detect FC anomalies by, inter alia, monitoring FC metrics 122 related to fuel consumption of the FCS 110.

Figure 4:
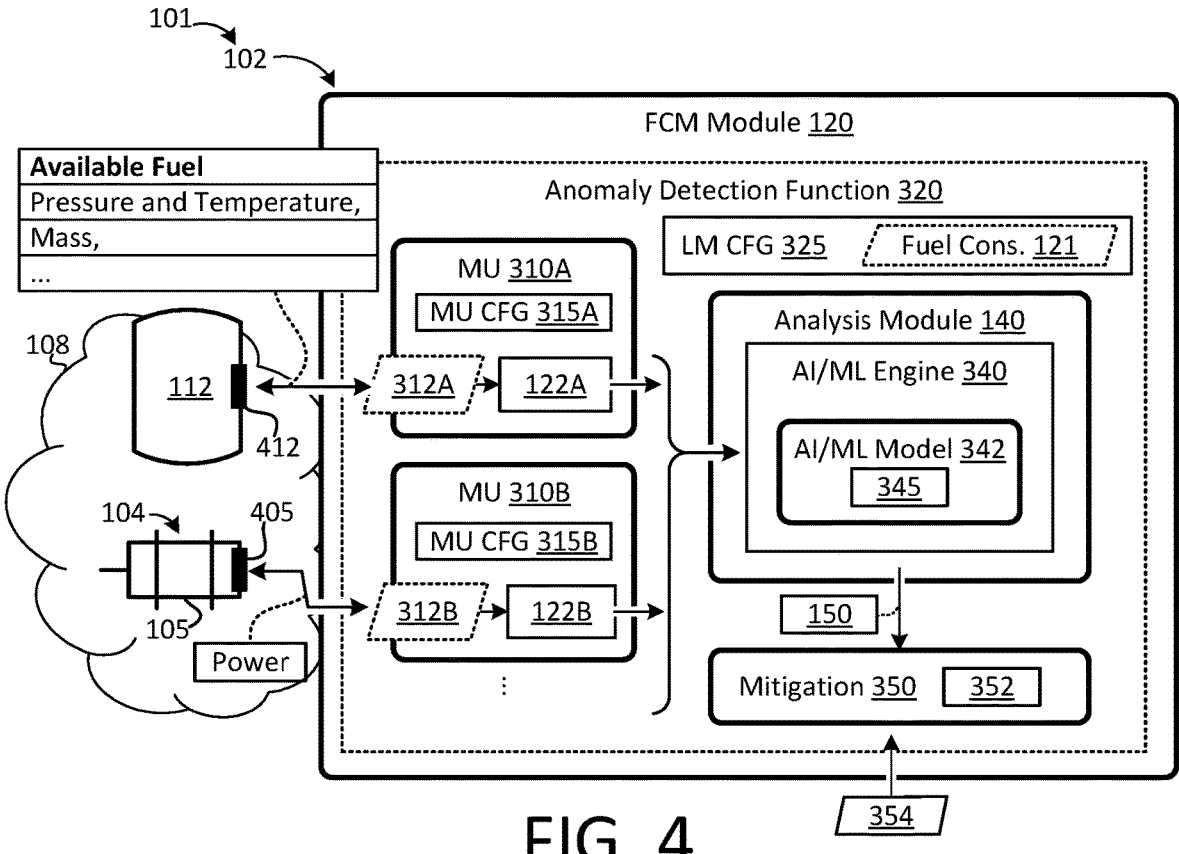
FIG. 4 is a schematic block diagram illustrating an example of a fuel cell monitoring module configured to detect fuel cell anomalies by monitoring a plurality of metrics pertaining to fuel consumption.

In the FIG. 4 example, the FCM module 120 may be configured to monitor related FC metrics 122 configured to track an FCCF 121 corresponding to fuel consumption by the FCS 110 (per the LM CFG 325). The FCM module 120 may be configured to monitor a plurality of related FC metrics 122, each configured to track the fuel consumption FCCF 121 during a designated FCM period 210.

The FCM module 120 may be configured to monitor a first FC metric 122A, which may be configured to track the fuel consumption FCCF 121 by, inter alia, monitoring the amount of fuel available within the fuel storage 112. The FC metric 122A may be derived from first FCM data 312A, the FCM data 312A comprising measurements directly pertaining to the amount of fuel available within the fuel storage 112 and/or an amount of fuel consumed by the FCS 110. The first FCM data 312A may include but are not limited to one or more of: temperature measurements of the fuel within the fuel storage 112, pressure measurements of the fuel, a mass of the fuel (and/or fuel storage 112), a weight of the fuel and/or fuel storage 112 (and/or the fuel storage therein), fuel gauge measurements, flow measurements acquired from the fuel coupling 113 and/or FCS 110 (e.g., fuel inflow measurements, fuel outflow measurements, and so on), and/or the like. For example, the FCM module 120 may be configured to acquire FCM data 312A comprising temperature and pressure measurements, which may indicate the amount of fuel available within the fuel storage 112 at the respective times (t) of the FCM period 210, e.g., $F_A(t)$ $f_{PT}(P(t), T(t))$, where $P(t)$ is the pressure within the fuel storage 112 at time t, $T(t)$ is the temperature of the fuel within the fuel storage 112 at time t, and $f_{PT}$ is a function configured to derive the amount of fuel available and/or remaining within the fuel storage 112 ($F_A$), based on pressure and temperature. The function $f_{PT}$ may be determined in accordance with characteristics of the fuel stored within the fuel storage 112 and/or the fuel storage 112 itself, such as the volume of the fuel storage 112, manufacturer-specific characteristics, and so on.

The FC metric 122A may be configured to quantify the amount of fuel consumed by the FCS 110 at time t, as follows: $F_C(t)=F_A(0)-F_A(t)$, where $F_A(0)$ is the amount of fuel available within the fuel storage 112 at the start (T_S) of the FCM period 210 (and/or the available fuel when the fuel storage 112 was last filled) such that the amount of fuel consumed by time t, $F_C(t)$, is a difference between the amount of fuel initially available at the start time $(T_S)$ of the FCM period, $F_A(0)$, and the amount of fuel available at time t, $F_A(t)$ or $f_{PT}(P(t), T(t))$. Alternatively, or in addition, the FC metric 122A may quantify fuel consumption between respective sample or measurement times $(t_i)$, as follows: $F_C(t_i)=F_A(t_{i-1})-F_A(t_i)$ or $F_C(t_i)=f_{PT}(P(t_{i-1}),T$ $(t_{i-1})-f_{PT}(P(t_i),T(t_i)$, where $F_A(t_{i-1})$ represents the amount of fuel available at a previous sample or measurement time $t_{i-1}$ per pressure and temperature measurements $P(t_{i-1})$, $T(t_{i-1})$ and $F_A(t_i)$ represents the amount of fuel available at the current sample or measurement time $t_i$ per the current pressure and temperature measurements $P(t_i)$, $T(t_i)$. Although particular examples of techniques for directly measuring fuel consumption (and/or fuel availability) are described herein, the disclosure is not limited in this regard and could be adapted to utilize any suitable technique based on any suitable measurements; for example, the FCM module 120 could be configured to monitor fuel consumption based on measurements of fuel mass or the like.

The FCM module 120 may be configured to acquire the direct measurements of the FCM data 312A by any mechanism or technique, as disclosed herein. The MU 310A may be configured to acquire aspects of the FCM data 312A from the fuel storage 112 itself (per the MU CFG 315A). For example, the FCM module 120 may be configured to acquire temperature and/or pressure measurements by use of a first device 412, such as a temperature sensor, pressure sensor, fuel storage controller, flow controller, and/or the like. Alternatively, or in addition, the MU 310A may be configured to acquire aspects of the FCM data 312A by monitoring signals on the internal network 108 of the FC machine 101 (e.g., monitoring signals communicated to a fuel gauge HMI component or the like).

The FCM module 120 may be further configured to monitor a second FC metric 122B. The FC metric 122B may be configured to track the same fuel consumption FCCF 121 as the FC metric 122A. The FC metric 122B, however, may track fuel consumption based on different types of FCM data 312B, e.g., indirect measurement data rather than direct measurement data. In the FIG. 4 example, the FC metric 122B may be configured to estimate fuel consumption based, at least in part, on FCM data 312B comprising measurements pertaining to power generation by the FCS 110. The FCM data 312B may monitor power output by any suitable method or technique including, but not limited to: monitoring power generated by the FCS 110 (e.g., monitoring power, current, voltage, and/or other quantities on one or more output terminals of the FCS 110), monitoring power consumed by the load 104 coupled to the FCS 110, monitoring signals on the internal network 108 of the FC machine 101 and/or vehicle 102 (e.g., filtering CAN signals pertaining to power generation by the FCS 110 and/or power consumption by the load 104), and so on.

In the example illustrated in FIG. 3, the MU 310B may be configured to acquire FCM data 312B comprising measurements pertaining to power supplied to the load 104 coupled to the FCS 110, such as the drivetrain 105 and/or the like. In some implementations, the FCM module 120 may be configured to acquire the FCM data 312B from a control device, such as a drivetrain controller 405 or the like. Alternatively, or in addition, the FCM module 120 may acquire aspects of the FCM data 312B by monitoring signals on the internal network 108, as disclosed herein (e.g., monitoring control signals, operator inputs, and/or the like), by monitoring operation of the drivetrain 105 (e.g., monitoring revolutions per minute (RPM) of one or more motors), and/or the like.

The second MU 310B may be configured to infer, predict, expect, and/or estimate fuel consumption by the FCS 110 from the indirect measurements of the second FCM data 312B, as disclosed herein. In some implementations, the MU 310B may be configured to estimate the fuel consumption FC metric 122B based on power efficiency data determined for the FCS 110. The power efficiency data for the FCS 110 may be defined and/or maintained within the MU CFG 315B, as disclosed herein. As disclosed herein, the power efficiency data may define a physical relationship between indirect measurement data and an FCCF 121. For example, the power efficiency data may define physical relationships between power output and fuel consumption; the power efficiency data may define physical relationships between power output and fuel consumption, fuel consumption and power output, and so on. For example, the power efficiency data may define a physical relationship between power output and fuel consumption, e.g., may be used to determine an estimate of the fuel consumed by the FCS 110 to produce a specified power output. The power efficiency data may also define the reverse physical relationship, e.g., define a physical relationship between fuel consumption and power output. For example, the power efficiency data may be used to estimate the amount of power output by the FCS 110 given a specified fuel consumption.

Figures 5A, 5B:
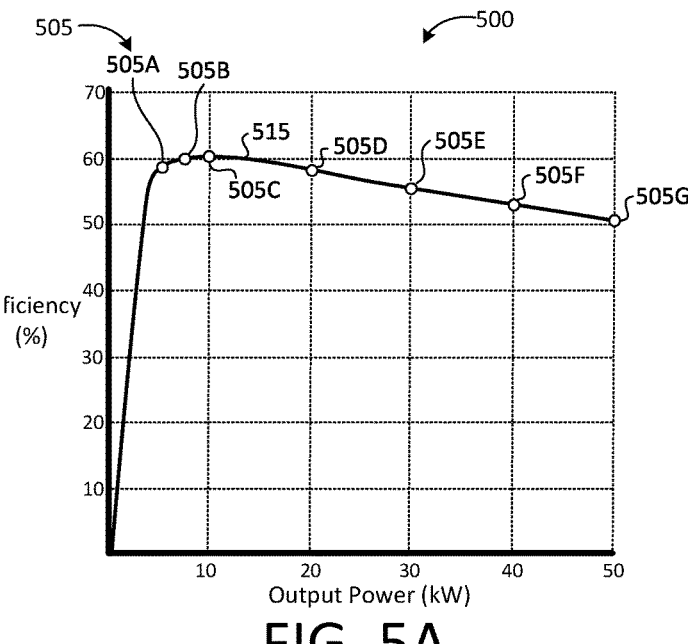
FIG. 5A illustrates an example of power efficiency data.
FIG. 5B illustrates further examples of power efficiency data.

FIG. 5A illustrates an example of power efficiency data. The plot 500 illustrates an example of an entry 515 of the power efficiency data. The entry 515 indicates the efficiency of the FCS 110 at respective output power levels ranging from 0 to 50 kilowatts (kW). The power efficiency data of the entry 515 may be based on technical documentation of the FCS 110 and/or previously acquired power efficiency data points 505, e.g., data points 505A-G configured to model power efficiency of the FCS 110 at respective power output levels.

The entry 515 may correspond to a specified set of operating conditions of the FCS 110. The operating conditions may define parameters that can impact the efficiency of the FCS 110, such as FCS 110 age, usage level, and/or the like. For example, the efficiency of the FCS 110 may degrade over time. In some implementations, the MU CFG 315B may comprise power efficiency data covering a range of operating conditions (e.g., a range of FCS ages and/or usage levels), as illustrated in FIG. 5B. Plot 501 of the FIG. 5B example illustrates examples of a plurality of entries 515A-N, each corresponding to respective age and/or usage conditions. The entries 515 may range from a first entry 515A corresponding to low age and/or usage to a last entry 515N corresponding to a high age and/or usage. Alternatively, or in addition, the power efficiency data may comprise a power efficiency map comprising efficiency estimates configured to cover a continuous range of operating conditions. The MU 310B may be configured to select an entry 515

Figure 6:
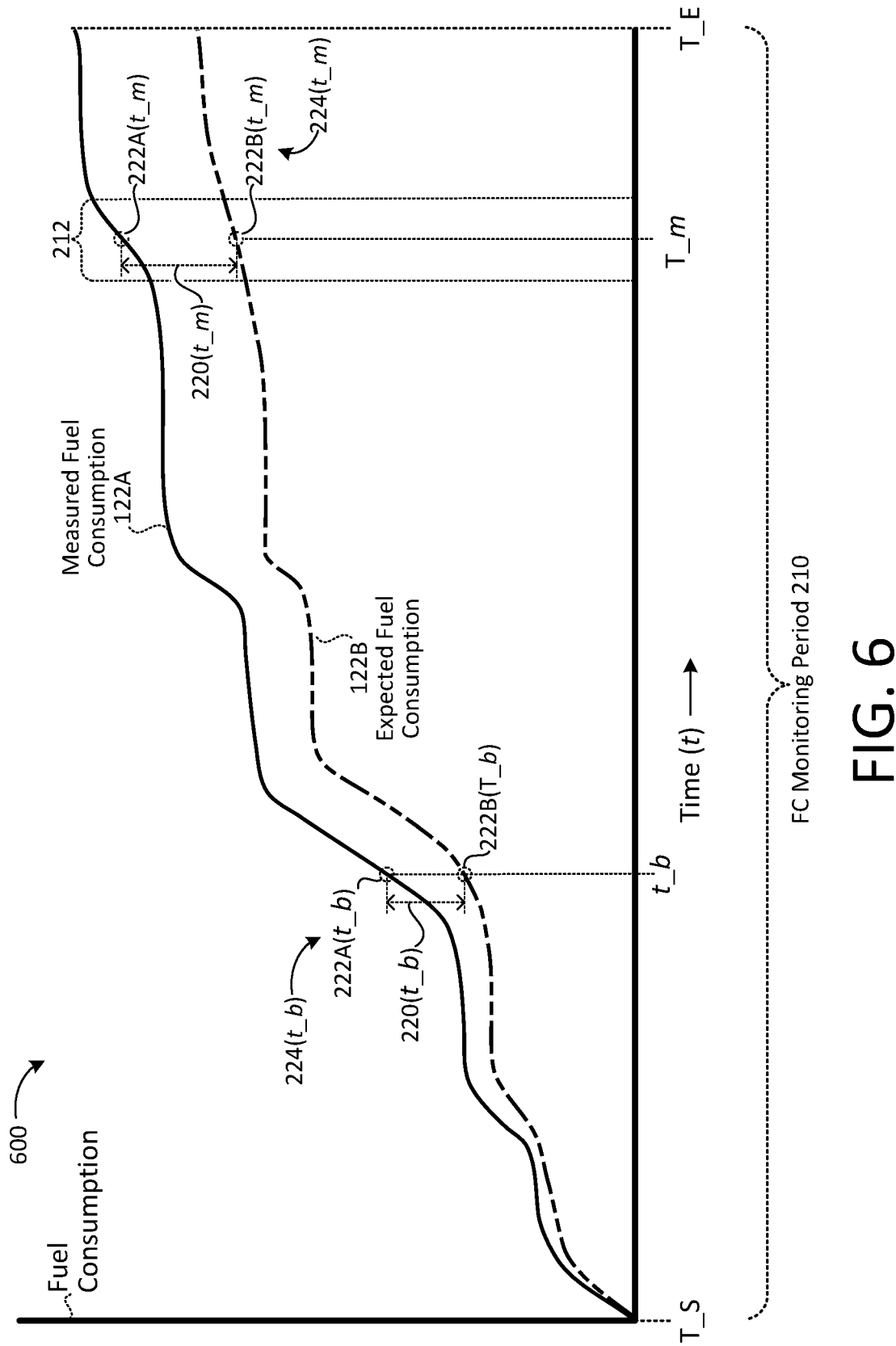
FIG. 6 illustrates further examples of fuel cell metrics configured for fuel leak detection, as disclosed herein.

FIG. 6 illustrates examples of related FC metrics 122 configured to track fuel consumption of the FCS 110 over respective FCM periods 210, as in the example illustrated in FIG. 4. As disclosed herein, the first FC metric 122A comprise and/or be derived from direct measurements of the fuel consumption FCCF 121 (FCM data 312A) and the second FC metric 122B may infer expected fuel consumption values from indirect measurements pertaining to fuel consumption (FCM data 312B), such as power output of the FCS 110, power supplied to the load 104, and/or the like.

As illustrated in the FIG. 6 example, the actual, measured fuel consumption FC metric 122A is higher than the expected fuel consumption FC metric 122B which may indicate, inter alia, that the FCS 110 consumed more fuel than expected to produce the amount of power tracked by the FCM module 120. In other words, the deviation may indicate that the FCS 110 is operating less efficiently than expected. As disclosed herein, this decrease in efficiency may be due to a number of factors, including fuel leak conditions.

The analysis module 140 may be configured to determine whether the related FC metrics 122 acquired by the FCM module 120 are indicative of anomalous operation of the FCS 110 and produce a corresponding AD output 150. The determination may be based, at least in part, on an error, difference, deviation, comparison and/or other analysis of the first FC metric 122A and the second FC metric 122B. The analysis module 140 may be configured to detect fuel leak condition(s) through one or more of: deviation analysis (e.g., evaluating a deviation between the related FC metrics 122A and 122B) as illustrated in FIG. 2A and the first non-limiting examples disclosed above, RoC analysis (e.g., analyzing RoC 222 and/or ΔRoC metrics 224 of the FC metrics 122A and 122B) as illustrated in FIGS. 2A, 2B and the second non-limiting examples disclosed above, CD analysis (e.g., analyzing a CD metric 226 indicative of a cumulative error, deviation, and/or difference between the related FC metrics 122A and 122B and/or a CD RoC 228) as illustrated in FIG. 2C and the third non-limiting examples disclosed above, window-based analysis, and/or the like.

In first non-limiting examples, the analysis at time t_b of the FIG. 6 example may comprise comparing a deviation metric 220(t_b) configured to quantify an error, difference, deviation, and/or other comparison between the related FC metrics 122A and 122B to an FC deviation threshold ($T_{FC\_Dev}$), the analysis at time t_m may comprise comparing the deviation metric 220(t_m) to the $F_C$ deviation threshold ($T_{FC\_Dev}$), and so on. Alternatively, or in addition, in second non-limiting examples, the analysis at time t_b may comprise determining an RoC 222A(t_b) of the first FC metric 122A and an RoC 222B(t_b) of the second FC metric 122B and comparing the resulting ΔRoC to an FC RoC threshold ($T_{FC\_Roc}$), the analysis at time t_m may comprise comparing a deviation determined between RoC 222A(t_m) and RoC 222B(t_m) to the FC RoC threshold ($T_{FC\_Roc}$), and so on. Alternatively, or in addition, in third non-limiting examples, the analysis at time t_b may comprise evaluating a derivative of the cumulative deviation between the FC metrics 122A and 122B (e.g., a CD RoC 228 determined at time t_b) to a CD RoC threshold ($T_{CD\_ROC}$), the analysis at time t_m may comprise comparing a CD RoC 228 determined at time t_m to the CD RoC threshold ($T_{CD\_ROC}$), and so on. In some implementations, one or more of the analysis techniques disclosed herein may be performed within and/or with respect to a subset of the FC monitoring period 210, such as the window 212 centered at time t_m, as illustrated in FIG. 6.

Figure 7A:
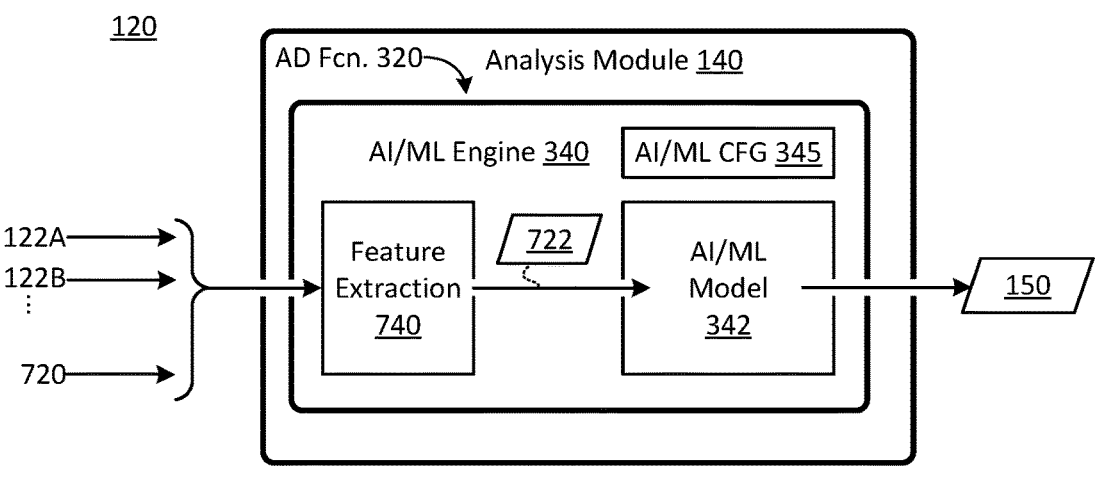
FIG. 7A is a schematic block diagram illustrating an example of an analysis module configured to implement aspects of fuel leak detection, as disclosed herein.

Alternatively, or in addition, the analysis module 140 may be configured to detect fuel leak condition(s) by use of an AI/ML engine 340 and/or AI/ML model 342, as disclosed herein. FIG. 7A is a schematic block diagram illustrating an example of an analysis module 140 comprising an AI/ML engine 340. The AI/ML engine 340 may comprise and/or be coupled to an AI/ML model 342, which may be trained and/or otherwise configured to detect fuel leak conditions based, at least in part, on AI/ML input data 722. The AI/ML input data 722 may comprise a set of related FC metrics 122 pertaining to the same FCCF 121. In the FIG. 7A example, the AI/ML input data 722 may comprise a plurality of FC metrics 122 configured to track fuel consumption of the FCS 110, as illustrated in FIG. 4. The AI/ML input data 722 may include a first FC metric 122A derived from direct fuel capacity measurements (e.g., FCM data 312A) and a second FC metric 122B, which may be determined by use of indirect measurements pertaining to the fuel consumption FCCF 121, such as power output of the FCS 110, power supplied to the load 104 coupled to the FCS 110, and/or the like (e.g., may be inferred, predicted, expected, calculated, estimated, and/or otherwise determined from indirect measurement data pertaining to fuel consumption).

In some implementations, the AI/ML input data 722 may further comprise FCS metadata 720. The FCS metadata 720 may comprise any suitable information pertaining to the FCS 110 and/or $F_C$ machine 101, which may include, but is not limited to: operating conditions (e.g., ambient temperature, temperature of the FCS 110, or the like), operating state (e.g., power output of the FCS 110), operator inputs, usage data, and/or the like. The usage data may indicate, inter alia, the age or utilization level of the FCS 110, such as the number of hours and/or fuel cycles endured by the FCS 110 or the like, utilization levels of respective FC of the FCS 110, and/or the like. Alternatively, or in addition, the FCS metadata 720 may indicate an efficiency of the FCS 110, e.g., by use of power efficiency data, or an entry 515 of the power efficiency data, or the like.

In some embodiments, the AI/ML engine 340 may further comprise a feature extraction module 740. The feature extraction module 740 may be configured to process the AI/ML input data 722. The feature extraction module 740 may be configured to implement any suitable data processing and/or conversion function, including, but not limited to: converting the AI/ML input data 722 into a form suitable for processing by the AI/ML model 342, normalizing the AI/ML input data 722, validating the AI/ML input data 722, filtering the AI/ML input data 722, and/or the like.

In some implementations, AI/ML model 342 may be configured to process respective datapoints (i), each datapoint (i) corresponding to a respective sample time (t). In other words, each set of AI/ML input data 722 may comprise an FC metric 122A and 122B acquired at time (t). Alternatively, or in addition, the AI/ML engine 340 may be configured to form AI/ML input data 722 corresponding to a range of datapoints and/or sample times, such as a window 212 or the like, as disclosed herein. The feature extraction module 740 may be configured to buffer and/or otherwise form window-based AI/ML input data 722 from data acquired by the FCM module 120, e.g., related FC metrics 122A and 122B, FCS metadata 720, and so on.

The AI/ML engine 340 of the analysis module 140 may be configured to implement aspects of the AD function 320 disclosed herein. The analysis module 140 may receive AI/ML input data 722 captured by the FCS module 120 and provide the AI/ML input data 722 to the AI/ML engine 340, which may configure and/or cause the AI/ML model 342 to produce an AD output 150 in response to the AI/ML input data 722. As disclosed herein, the AD output 150 may indicate whether the related FC metrics 122A and 122B are indicative of a fuel leak condition, quantify a degree to which the related FC metrics 122A and 122B are indicative of a fuel leak condition, or the like.

As illustrated in the FIG. 7A example, the AI/ML engine 340 may be configured to implement AI/ML configuration data (or an AI/ML CFG 345). As disclosed herein, an AI/ML CFG 345 may comprise and/or refer to any suitable data configured to cause the AI/ML model 342 to distinguish FC metrics 122A and 122B that are indicative of anomalous operation of the FCS 110 from FC metrics 122A and 122B corresponding to nominal, non-anomalous operation (e.g., detect fuel leak conditions, as disclosed herein).

The AI/ML CFG 345 may be adapted for any suitable type(s) of AI/ML model 342, e.g., any suitable AI/ML architecture, AI/ML algorithm, and/or the like. The AI/ML CFG 345 may comprise information (e.g., hyperparameters) pertaining to implementation of the AI/ML model 342. For example, the AI/ML model 342 may comprise an ANN and the AI/ML CFG 345 may comprise information pertaining to: the architecture of the ANN, the architecture of respective sub-components of the ANN (e.g., define the types of nodes and/or layers implemented by the ANN, such as input layers, hidden layers, fully-connected layers, dropout layers, convolutional layers, linear layers, an output layer, and/or the like), the configuration of respective layers, the number of nodes included in respective layers, interconnections between nodes and/or layers (e.g., fully connected, non-fully connected, sparsely connected, or the like), the configuration of respective nodes (e.g., specify activation functions for nodes of respective layers), AI/ML parameters learned for respective nodes (e.g., activation function weights, interconnection parameters, and/or the like), and so on. The disclosure is not limited in this regard, however, and could be adapted to include AI/ML CFG 345 corresponding to any suitable AI/ML component(s), AI/ML architecture(s), and/or AI/ML algorithm(s).

In some implementations, the AI/ML CFG 345 may be learned, developed, and/or refined in one or more AI/ML training procedures. In some cases, the time and/or overhead involved in developing an AI/ML CFG 345 capable of accurately identifying fuel leak conditions may be significant. Therefore, in some implementations, the AI/ML engine 340 may be configured to implement a predetermined AI/ML CFG 345. For example, the AI/ML CFG 345 of the AI/ML model 342 may have been learned in one or more previously completed AI/ML training procedures. The AI/ML training procedures may be implemented by the AI/ML model 342 itself. Alternatively, one or more of the AI/ML training procedures may be completed by a different system or device, e.g., a different AI/ML model 342 of a different FCM device 130.

The analysis module 140 may utilize predetermined AI/ML CFG 345 to avoid the complexity and overhead involved in learning the AI/ML CFG 345. By way of non-limiting example, a first AI/ML CFG 345 adapted to detect potential fuel leak conditions of a particular FCS 110 and/or FC machine 101 may be developed through AI/ML training procedures completed on (or by) a first FCM module 120. The first AI/ML CFG 345 may then be used to configure other FCM modules 120. For instance, a second FCM module 120 may leverage the first AI/ML CFG 345 to implement aspects of the AD function 320 without incurring the overhead involved in training the AI/ML model 342, e.g., without repeating the procedure(s) by which the first AI/ML CFG 345 was learned.

Utilizing a predetermined AI/ML CFG 345 may comprise a) retrieving a predetermined AI/ML CFG 345, b) configuring the AI/ML model 342 in accordance with the predetermined AI/ML CFG 345, and c) implementing aspects of the AD function 320 by use of the configured AI/ML model 342. The predetermined AI/ML CFG 345 may be retrieved through any suitable means including, but not limited to: a memory, memory 133 of the FCM device 130, computer-readable storage, NT storage 134, network-accessible storage, the data interface 136, and/or the like. Configuring the AI/ML engine 340 in accordance with the retrieved, predetermined AI/ML CFG 345 may comprise instantiating and/or configuring AI/ML component(s), applying learned AI/ML configuration data, such as weights, biases, and/or other parameters, and so on. Alternatively, or in addition, aspects of the predetermined AI/ML CFG 345 may be embedded within a hardware and/or firmware implementation of the AI/ML engine 340 and/or AI/ML model 342.

Although examples utilizing predetermined AI/ML CFG 345 are described herein, the disclosure is not limited in this regard. For example, in some implementations, the AI/ML model 342 may comprise an AI/ML architecture that does not require training, e.g., may implement an unsupervised AI/ML algorithm or the like. Alternatively, or in addition, the AI/ML engine 340 may comprise and/or be coupled to a training module 710, as illustrated in the FIG. 7B example.

The training module 710 may be configured to train the AI/ML model 342 to accurately identify FC metrics 122 that are indicative of fuel leak conditions. The training module 710 may comprise and/or be coupled to a dataset 730 comprising a plurality of AI/ML entries 732, each comprising respective AI/ML input data 722 (e.g., a set of related FC metrics 122, such as fuel consumption FC metrics 122A and 122B, as disclosed herein). The AI/ML entries 732 may further comprise ground truth (GT) data 735; the GT data 735 of an AI/ML entry 732 may comprise a known, predetermined AD output 150 for the AI/ML input data 722 of the AI/ML entry 732. For example, the GT data 735 may indicate whether the AI/ML input data 722 of the AI/ML entry 732 are indicative of a fuel leak condition (and/or indicate a degree to which the FC metrics 122 are indicative of a fuel leak condition). In the FIG. 7B example, the dataset 730 comprises T entries, including AI/ML input data 722A-T having corresponding GT data 735, such as known, predetermined AD outputs 150A-T.

In some implementations, the training module 710 may comprise an evaluation module 712. The evaluation module 712 may comprise logic configured to compare AD outputs 150 produced by the AI/ML model 342 to GT data 735 of the dataset 730 and update the AI/ML model 342 (and/or AI/ML CFG 345 thereof) based on errors, differences, deviations, and/or other comparative analysis. The training module 710 may be configured to implement iterative AI/ML training procedures. An iteration of such a procedure may include: a) selecting an AI/ML entry 732 from the dataset 730, b) providing AI/ML input data 722 of the selected AI/ML entry 732 to the AI/ML engine 340, and c) configuring the AI/ML engine 340 and/or AI/ML model 342 to produce an AD output 150 in response to the AI/ML input data 722, d) comparing the AD output 150 produced by the AI/ML model 342 to GT data 735 of the selected AI/ML entry 732, and e) updating the AI/ML model 342 and/or AI/ML CFG 345 based, at least in part, on the comparing.

The AI/ML model 342 may be configured to implement any suitable AI/ML algorithm and/or architecture. In some implementations, the AI/ML model 342 may be adapted to implement a linear regression algorithm. The AI/ML model 342 may be configured to model the relationships between a scalar response and a set of explanatory variables, such as the first FC metric 122A (e.g., the measured fuel consumption of the FCS 110) and the second FC metric 122B (e.g., the expected fuel consumption of the FCS 110). The AI/ML model 342 may be configured to model the relationships using any suitable technique, including, but not limited to: linear regression, linear predictor functions, or the like. In some implementations, the AI/ML model 342 may comprise a linear predictor. The AI/ML CFG 345 may configure the AI/ML model 342 to implement a linear predictor function ($f_{LI}$) and may compute predictions for respective data points (i), e.g., AI/ML input data 722 acquired at respective times t, corresponding to p explanatory variables (e.g., AI/ML input data 722), as follows: $f_{LI}(i)=\beta_0+\beta_1 x_{i1}+ \ldots +\beta_p x_{ip}$, where $x_{ik}$ is the value of the k-th explanatory variable for data point i (e.g., time t) and $\beta_0, \ldots, \beta_p$ are learned coefficients indicating the relative effect of a particular explanatory variable on the resulting prediction. The AI/ML CFG 345 may, for example, learn a $f_{LI}(i)$ function configured to predict whether and/or a degree to which respective AI/ML input data 722 are indicative of fuel leak conditions.

Figure 7B:
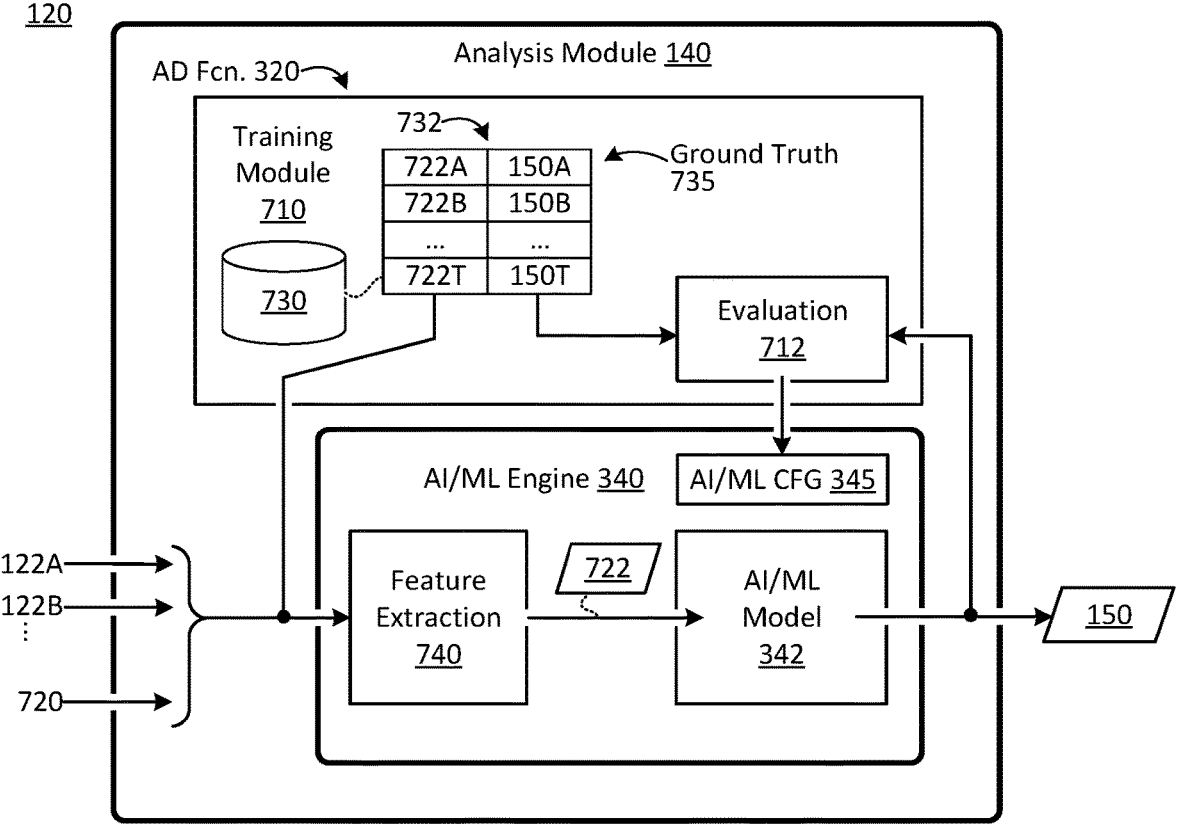
FIG. 7B is a schematic block diagram illustrating another example of an analysis module configured to implement aspects of fuel leak detection, as disclosed herein.
Figure 7C:
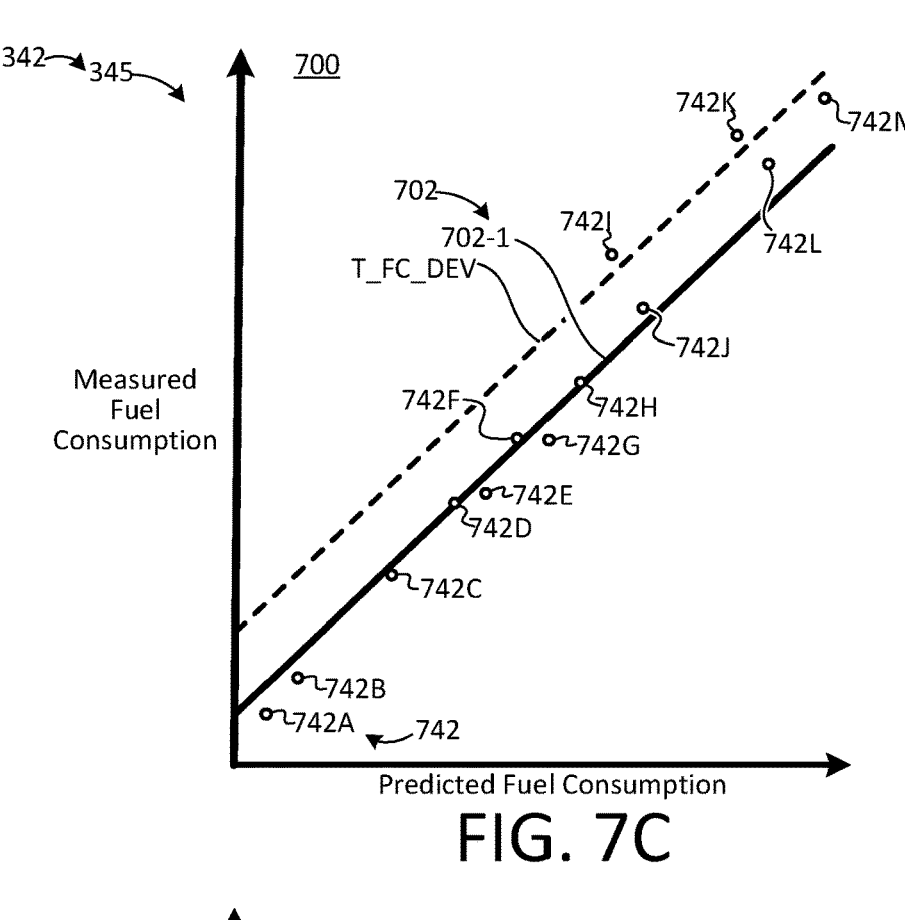
FIG. 7C illustrates aspects of an example of a linear regression predictor for fuel leak detection.

FIG. 7C illustrates an example of AI/ML CFG 345 determined for an AI/ML model 342 comprising a linear regression predictor 702. More specifically, the plot 700 of FIG. 7C illustrates an example of a linear regression, fuel consumption (LR_FC) predictor 702-1 configured to model a linear relationship between predicted fuel consumption of the FCS 110 and actual measured fuel consumption, e.g., a linear relationship between an actual, measured fuel consumption FC metric 122A and an expected fuel consumption FC metric 122B. The plot 700 further illustrates example linear regression (LR) datapoints 742. The LR datapoints 742 may comprise and/or correspond to respective sets of related FC metrics 122. For example, each LR datapoint 742 may comprise and/or be derived from a measured FC metric 122A and corresponding expected FC metric 122B (e.g., measured fuel consumption and predicted fuel consumption). The LR datapoints 742 may, therefore, correspond to AI/ML input data 722, as disclosed herein.

In the FIG. 7C example, the LR datapoints 742A-M may correspond to a range of increasing fuel consumption levels (and/or increasing power output levels). The vertical or y-axis of the plot 700 may correspond to increasing measured fuel consumption (e.g., FC metric 122A) and the horizontal or x-axis of the plot 700 may correspond to increasing estimated or predicted fuel consumption of the FCS 110 (e.g., FC metric 122B). Accordingly, the LR datapoint 742A may comprise and/or correspond to related FC metrics 122 acquired under operating conditions involving low or minimal fuel consumption by the FCS 110 during the FC monitoring period 210, LR datapoint 742M may comprise and/or correspond to related FC metrics 122 acquired during periods of high or maximum fuel consumption by the FCS 110, and so on.

As shown in FIG. 7C, the measured fuel consumption (FC metric 122A) may be higher than the predicted fuel consumption (FC metric 122B) due to a number of factors, including potential fuel leak conditions. The linear regression AI/ML model 342 may be configured to distinguish deviation that is due to fuel leak conditions from deviation caused by other factors, e.g., efficiency or the like. The AI/ML model 342 may detect a fuel leak condition in response to related FC metrics 122 that deviate from the LR_FC predictor 702-1 by more than a learned threshold. Alternatively, the learned threshold may be incorporated into the LR_FC predictor 702-1. In the FIG. 7C implementation, the LR_FC predictor 702-1 and/or threshold may be linear. In other words, the LR_FC predictor 702-1 and/or threshold may be constant across a range of fuel consumption and/or power output levels. By way of non-limiting example, the linear regression AI/ML model 342 may identify fuel leak conditions by use of a learned FC deviation threshold ($T_{FC\_Dev}$), as illustrated in FIG. 7C. Accordingly, in the FIG. 7C example, the related FC metrics 122 of datapoints 7421 and 742K may trigger detection of a fuel leak condition. The disclosure is not limited in this regard, however, and could detect fuel leak conditions by use of any suitable threshold and/or comparison, such as a non-linear threshold, an adaptive threshold (e.g., different threshold at respective fuel consumption levels), and/or the like.

In some implementations, the AI/ML model 342 may be configured to learn an LR_FC predictor 702-1 configured for use with FC metrics 122 corresponding to a range of FCS ages and/or usage levels. Alternatively, or in addition, the AI/ML model 342 may be configured to learn a plurality of different LR_FC predictors 702-1, each corresponding to a respective age and/or usage level. For example, the AI/ML CFG 345 may configure the AI/ML model 342 to implement a plurality of LR_FC predictors 702-1, each configured for use with an FCS 110 and/or FC machine 101 during a respective age and/or usage range, as illustrated in FIG. 7D.

Figure 7D:
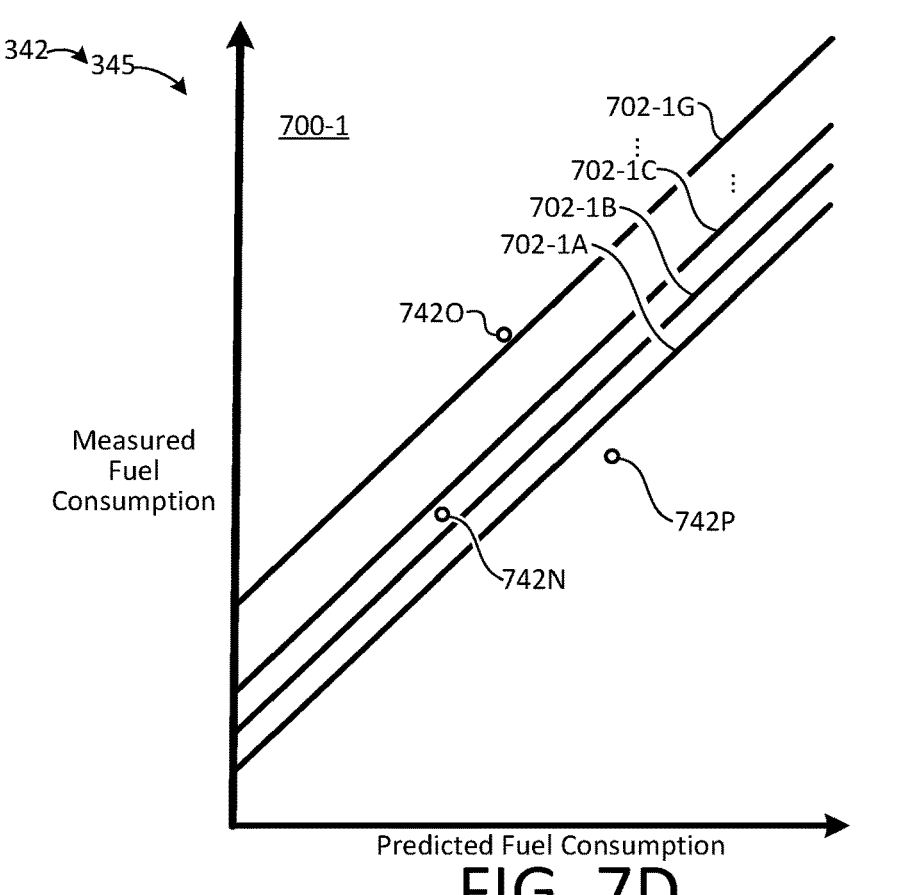
FIG. 7D illustrates aspects of example age-based linear regression predictors for fuel leak detection.

Plot 700-1 of FIG. 7D illustrates further examples of linear regression predictors 702. In the FIG. 7D implementation, the AI/ML model 342 may be configured to model relationships between measured fuel consumption and predicted fuel consumption of the FCS 110 across a range of FCS usage levels and/or ages. As disclosed herein, the efficiency of the FCS 110 may decrease with increasing usage level. As such, the deviation between measured fuel consumption (FC metric 122A) and predicted fuel consumption (FC metric 122B) may increase with increasing FCS age.

In the FIG. 7D example, the AI/ML CFG 345 may configure the AI/ML model 342 to implement a plurality of LR_FC predictors 702-1A through 702-1G, each corresponding to a respective FCS age and/or usage range. The LR_FC predictors 702-1A through 702-1G may incorporate respective, learned fuel-consumption deviation thresholds, such as respective FC deviation thresholds ($T_{FC\_Dev}$), as illustrated in FIG. 7C.

The LR_FC predictors 702-1A through 702-1G may be configured to model the decreasing efficiency of the FCS 110 over time, e.g., per power efficiency data and/or a power efficiency map, as disclosed herein (e.g., from a low usage range A to a high usage range G). The LR_FC predictor 702-1A may be configured to detect fuel leak conditions of an FCS 110 during a first, low usage range A, the LR_FC predictor 702-1B may be configured to detect fuel leak conditions of the FCS 110 during a next usage range B, the LR_FC predictor 702-1C may be configured to detect fuel leak conditions in the FCS 110 during a next higher usage range C, the LR_FC predictor 702-1G may be configured to detect fuel leak conditions in the FCS 110 during a high or maximum usage range G, and so on. The learned LR_FC predictors 702-1A through 702-1G may, therefore, be capable of distinguishing fuel consumption deviations that are indicative of fuel leak conditions at a range of different LCS usage levels and/or ages. For example, the LR datapoint 742N may trigger detection of a fuel leak condition during low usage ranges A and B, but may not trigger fuel leak detection during later usage ranges C through G (e.g., due to reduced efficiency during the later usage ranges C through G). The deviation of LR datapoint 742O, however, may be indicative of a fuel leak condition regardless of FCS usage level (e.g., may be detected as a potential fuel leak during any of the usage ranges A through G). Conversely, the low deviation of LR datapoint 742P may be indicative of nominal operation of the FCS 110 across usage ranges A through G.

Although examples of linear regression predictors based on particular types of related FC metrics 122 are described herein, the disclosure is not limited in this regard and could be adapted to implement linear regression prediction utilizing any suitable FC metrics 122. For example, FIG. 7E illustrates aspects of a linear regression predictor 702 configured to detect fuel leak conditions based, at least in part, on fuel consumption RoC 222 (and/or ΔRoC metrics 224), as disclosed herein.

Figure 7E:
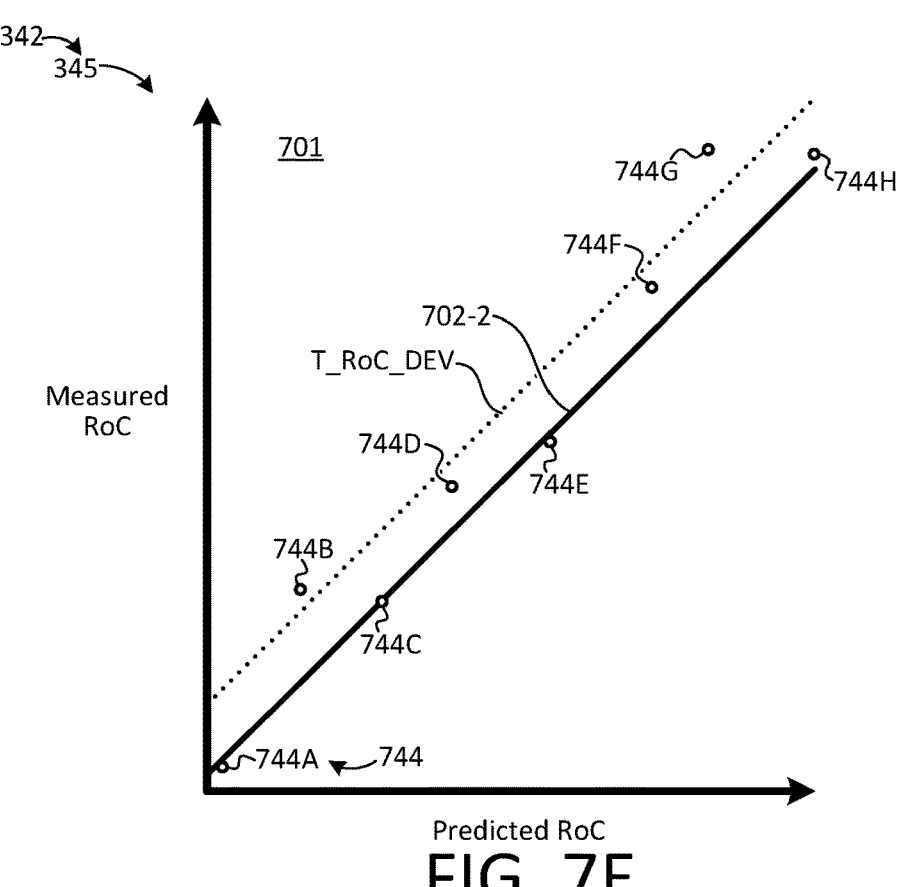
FIG. 7E illustrates aspects of another example of a linear regression predictor for fuel leak detection.

FIG. 7E illustrates another example of AI/ML CFG 345 an AI/ML model 342 configured to implement linear regression. In the FIG. 7D example, the AI/ML model 342 may comprise a linear regression RoC (LR_RoC) predictor 702-2 configured to model a linear relationship between a predicted RoC of FCS 110 fuel consumption and the actual, measured fuel consumption RoC 222, e.g., a linear relationship between measured FC RoC 222A and predicted $F_C$ RoC 222B, as disclosed herein. In plot 701 of FIG. 7E, the vertical or y-axis may correspond to increasing measured fuel consumption RoC 222A and the horizontal or x-axis may correspond to increasing predicted fuel consumption RoC 222B. The LR_RoC predictor 702-2 may be configured to model ΔRoC metrics 224 that are indicative of nominal operation of the FCS 110. By way of non-limiting example, ΔRoC metrics 224 that deviate from the LR_RoC predictor 702-2 by more than an FC RoC threshold ($T_{FC\_Roc}$) may result in detection of a fuel leak condition.

Plot 701 of FIG. 7E further illustrates example RoC datapoints 744 (e.g., AI/ML input data 722), each derived from related FC metrics 122 corresponding to a respective fuel consumption and/or RoC level. The RoC datapoints 744A-H may comprise and/or correspond to related FC metrics 122 (e.g., a measured RoC 222A and predicted RoC 222B); the RoC datapoint 744A may comprise and/or be derived from related FC metrics 122 acquired during periods of low fuel consumption RoC 222, the RoC datapoint 744H may comprise and/or be derived from related FC metrics 122 acquired during high, or maximum RoC 222, and so on.

The AI/ML model 342 may be configured to distinguish ΔRoC metrics 224 that are indicative of fuel leak conditions from ΔRoC metrics 224 corresponding to nominal operation of the FCS 110. In some implementations, the AI/ML model 342 may detect a fuel leak condition in response to related FC metrics 122 that deviate from the LR_RoC predictor 702-2 by more than a learned threshold. In some implementations, the LR_RoC predictor 702-2 and/or threshold may be linear. In some implementations, the LR_RoC predictor 702-2 may incorporate the learned threshold. Alternatively, in the non-limiting example illustrated in FIG. 7E, the AI/ML model 342 may identify fuel leak conditions by use of a learned FC RoC deviation threshold ($T_{FC\_RoC}$). In the illustrated example, the datapoints 744B and 744G may be indicative of a fuel leak condition, whereas the other datapoints 744A, 744C, 744D, 744E, 744F, and 744H may be indicative of nominal operation of the FCS 110. The disclosure is not limited in this regard, however, and could detect fuel leak conditions by use of any suitable threshold and/or comparison, such as a non-linear threshold, an adaptive threshold (e.g., different threshold at respective RoC levels), and/or the like.

In some implementations, the AI/ML model 342 may be configured to learn an LR_RoC predictor 702-2 configured for use with FC metrics 122 corresponding to a range of different ages and/or usage levels. Alternatively, or in addition, the AI/ML model 342 may be configured to learn a plurality of different LR_RoC predictors 702-2, each corresponding to a respective age and/or usage level. For example, the AI/ML CFG 345 may configure the AI/ML model 342 to implement a plurality of different LR_FC predictors 702-1, each configured for use with an FCS 110 and/or FC machine 101 of a respective age or usage level, as illustrated in FIG. 7F.

Figure 7F:
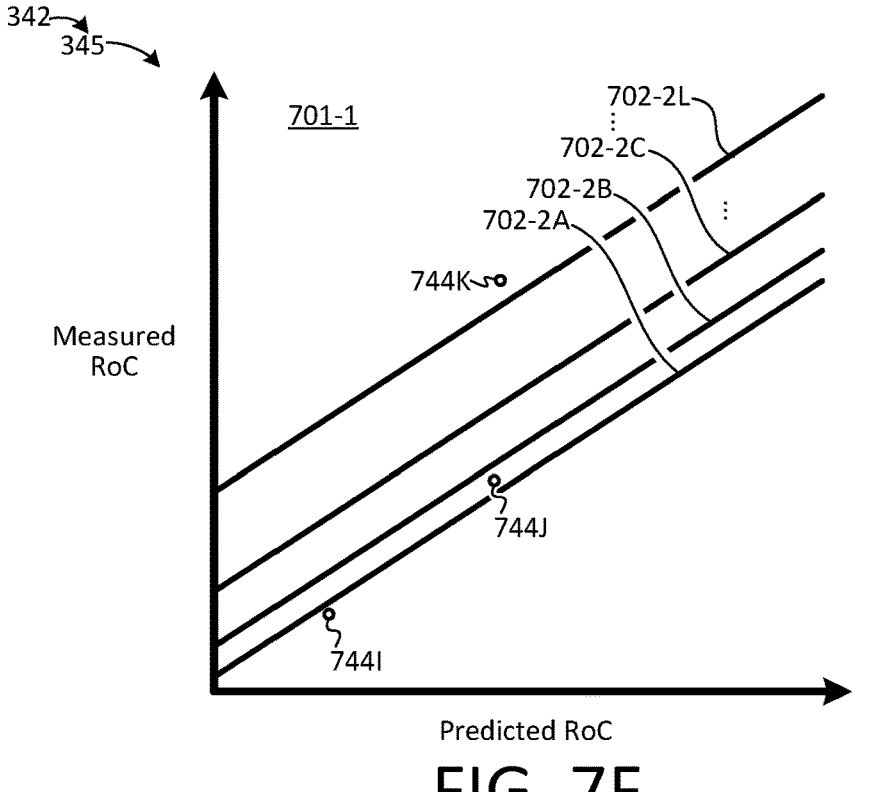
FIG. 7F illustrates aspects of additional examples of age-based linear regression predictor for fuel leak detection.

Plot 701-1 of FIG. 7F illustrates further examples of linear regression predictors 702. In the FIG. 7F implementation, the AI/ML model 342 may be configured to model relationships between measured fuel consumption RoC 222A and predicted fuel consumption RoC 222B across a range of FCS usage levels and/or ages. As disclosed herein, the efficiency of the FCS 110 may decrease with increasing usage level. As such, the deviation between measured RoC 222A (FC metric 122A) and predicted RoC 222B (FC metric 122B) may increase with increasing FCS age.

In the FIG. 7F implementation, the AI/ML CFG 345 may configure the AI/ML model 342 to implement a plurality of LR_RoC predictors 702-2A through 702-2L, each corresponding to a respective FCS age and/or usage range. The LR_RoC predictors 702-2A through 702-2L may incorporate respective, learned thresholds, such as respective RoC thresholds ($T_{FC\_Roc}$), as illustrated in FIG. 7E.

The LR_RoC predictors 702-2A through 702-2L may be configured to model the decreasing efficiency of the FCS 110 over time, e.g., per power efficiency data and/or a power efficiency map, as disclosed herein (e.g., from a low usage range A to a high usage range L). The LR_RoC predictor 702-2A may be configured to detect fuel leak conditions of an FCS 110 during a first, low usage range A, the LR_RoC predictor 702-2B may be configured to detect fuel leak conditions of the FCS 110 during a next usage range B, the LR_RoC predictor 702-2C may be configured to detect fuel leak conditions in the FCS 110 during a next higher usage range C, the LR_RoC predictor 702-2L may be configured to detect fuel leak conditions in the FCS 110 during a high or maximum usage range L, and so on. The learned LR_RoC predictors 702-2A through 702-2L may, therefore, be capable of distinguishing RoC deviations that are indicative of fuel leak conditions at a range of different FCS usage levels and/or ages. For example, the RoC datapoint 744J may trigger detection of a fuel leak condition during the low usage range A but may not trigger fuel leak detection during subsequent usage ranges B through G (e.g., due to reduced efficiency during the later usage ranges B through G). The deviation of RoC datapoint 744K may be indicative of a fuel leak condition regardless of FCS usage level (e.g., may be detected as a potential fuel leak during any of the usage ranges A through L). Conversely, the low ΔRoC of RoC datapoint 744I may be indicative of nominal operation of the FCS 110 across usage ranges A through L.

Referring to FIGS. 7A and 7B, in some implementations, the AI/ML model 342 may comprise a linear classifier or the like. The AI/ML CFG 345 may configure the AI/ML model 342 to produce output scores (y) in response to input feature vectors (i), e.g., AI/ML input data 722, as follows: $y = f(\vec{w} \cdot \vec{x}) = f(\Sigma_j w_j x)$, where $\vec{w}$ is a vector of learned weights and $f$ is a function that converts the dot product of the weights ($\vec{w}$) and AI/ML input data 722 ($x$) into a prediction, e.g., an AD output 150, as disclosed herein. In some implementations, the AI/ML model 342 may be configured to learn a linear classifier configured for use with FC metrics 122 corresponding to a range of different FCS usage and/or age levels. Alternatively, or in addition, the AI/ML model 342 may be configured to learn a plurality of different linear regression predictors 702, each corresponding to a respective age and/or usage level. For example, the AI/ML CFG 345 may configure the AI/ML model 342 to a plurality of different linear regression predictors 702, each configured for use with an FCS 110 and/or $F_C$ machine 101 of a respective age or usage level.

Figure 7G:
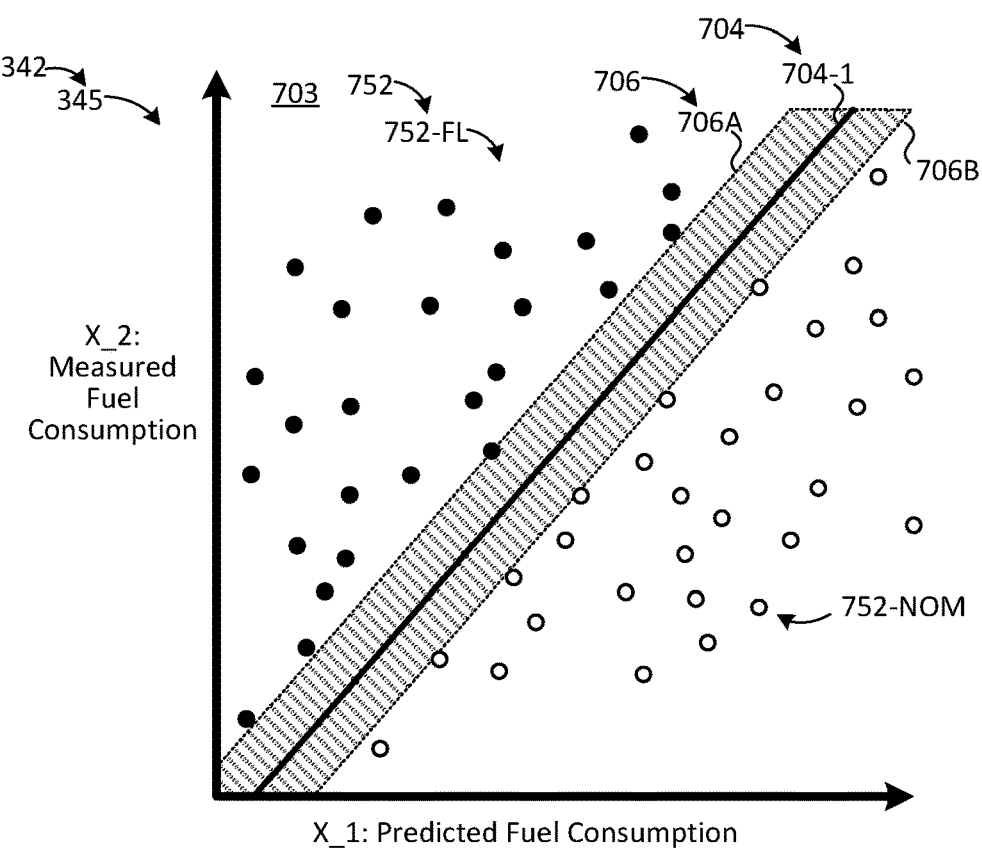
FIG. 7G illustrates aspects of an example of a support vector machine configured for fuel leak detection.

Alternatively, or in addition, the AI/ML model 342 may comprise a support vector machine (SVM). In some implementations, the AI/ML model 342 may comprise a one-class SVM configured to distinguish anomalous operation of the FCS 110 from non-anomalous behavior. The AI/ML model 342 may be configured to learn the AI/ML CFG 345 and/or otherwise learn to distinguish anomalous $F_C$ behavior without the need of labeled training data, e.g., without a dataset 730 comprising AI/ML entries 732 having known, predetermined GT data 735. The SVM of the AI/ML model 342 may be configured to represent datapoints (e.g., sets of related FC metrics 122) as p-dimensional points in a decision space such that points from different categories (e.g., anomalous versus non-anomalous) are separated by a hyperplane within the decision space. The hyperplane learned by the AI/ML model 342 may be referred to as an SVM decision boundary 704, as illustrated in FIG. 7G. In response to receiving AI/ML input data 722, the AI/ML model 342 may be configured to map the AI/ML input data 722 into the decision space (e.g., as an SVM datapoint 752) and assign a category or classification thereto based on the position of the AI/ML input data 722 relative the SVM decision boundary 704. In other words, the position of the AI/ML input data 722 relative to the learned SVM decision boundary 704 within the decision space may indicate whether the AI/ML input data 722 (e.g., related FC metrics 122A and 122B) are indicative of a fuel leak condition. In some implementations, the SVM decision boundary 704 may comprise hyperplane of dimension p–1, where p is the size of respective SVM datapoints 752 (e.g., the number of elements included in respective SVM vectors). Alternatively, the AI/ML model 342 may learn one or more non-linear decision boundaries. Moreover, the AI/ML model 342 may be configured to learn a decision boundary for use across a range of operating conditions. Alternatively, the AI/ML CFG 345 may configure the AI/ML model 342 to implement one of a plurality of learned SVM, each corresponding to a respective age or usage level.

FIG. 7G illustrates an example of an AI/ML CFG 345 configured for an AI/ML model 342 comprising an SVM. The plot 703 illustrates aspects of a learned SVM decision boundary 704 of the AI/ML model 342. In the FIG. 7G example, the learned SVM decision boundary 704 may be configured to separate SVM datapoints 752 (e.g., AI/ML input data 722) into designated classes based on related fuel consumption FC metrics 122. In other words, the SVM decision boundary 704 illustrated in FIG. 7G may comprise a fuel-consumption SVM decision boundary 704-1. The SVM decision boundary 704-1 may be configured to distinguish SVM datapoints 752 that are indicative of nominal operation of the FCS 110 (SVM datapoints 752-NOM) from SVM datapoints 752 that are indicative of fuel leak conditions (SVM datapoints 752-FL), the SVM datapoints 752 comprising and/or derived from related FC metrics 122 pertaining to fuel consumption of the FCS 110. The SVM datapoints 752 may comprise respective p dimensional vectors, e.g., respective vectors $\{x_1, \ldots, x_p\}$. In the FIG. 7G example, each SVM datapoint 752 may comprise a two-dimensional vector, such as predicted fuel consumption and measured fuel consumption $\{122B, 122A\}$. The SVM datapoints 752 may, for example, comprise intersections between an expected FC metric 122B (illustrated along the horizontal or x-axis of the plot 703) and the corresponding measured $F_C$ metric 122A (illustrated along the vertical or y-axis of the plot 703).

The learned SVM decision boundary 704-1 may comprise a p–1 dimensional hyperplane (a 1-dimensional plane or line). In some implementations, the SVM decision boundary 704-1 may further comprise one or more learned margin hyperplanes 706. In the FIG. 7G example, the learned SVM decision boundary 704-1 comprises a first margin hyperplane 706A and a second margin hyperplane 706B. The SVM decision boundary 704-1 may be learned through one or more supervised and/or unsupervised AI/ML training techniques. As disclosed herein, the SVM decision boundary 704-1 may be learned such that SVM datapoints 752-NOM (AI/ML input data 722) indicative of nominal operation of the FCS 110 are distinguished and/or separated from SVM datapoints 752-FL indicative of fuel leak conditions. The nominal SVM datapoints 752-NOM may comprise related FC metrics 122 where the measured fuel consumption corresponds with the predicted fuel consumption of the FCS 110, e.g., the measured FC metric 122A is within a threshold of the corresponding expected FC metric 122B, such as an FC deviation threshold ($T_{FC\_Dev}$) or the like. Conversely, the anomalous SVM datapoints 752-FL may comprise related FC metrics 122 where the measured fuel consumption (first FC metric 122A) is greater than the predicted fuel consumption (second FC metric 122B), e.g., exceeds the FC deviation threshold ($T_{FC\_Dev}$).

In some implementations, the AI/ML model 342 may be configured to implement an SVM configured to cover a range of FCS age and/or usages. Alternatively, or in addition, the AI/ML model 342 may comprise and/or implement a plurality of SVM, each corresponding to a respective age and/or usage range, e.g., usage levels A through F, as illustrated in the FIG. 7H example.

Figure 7H:
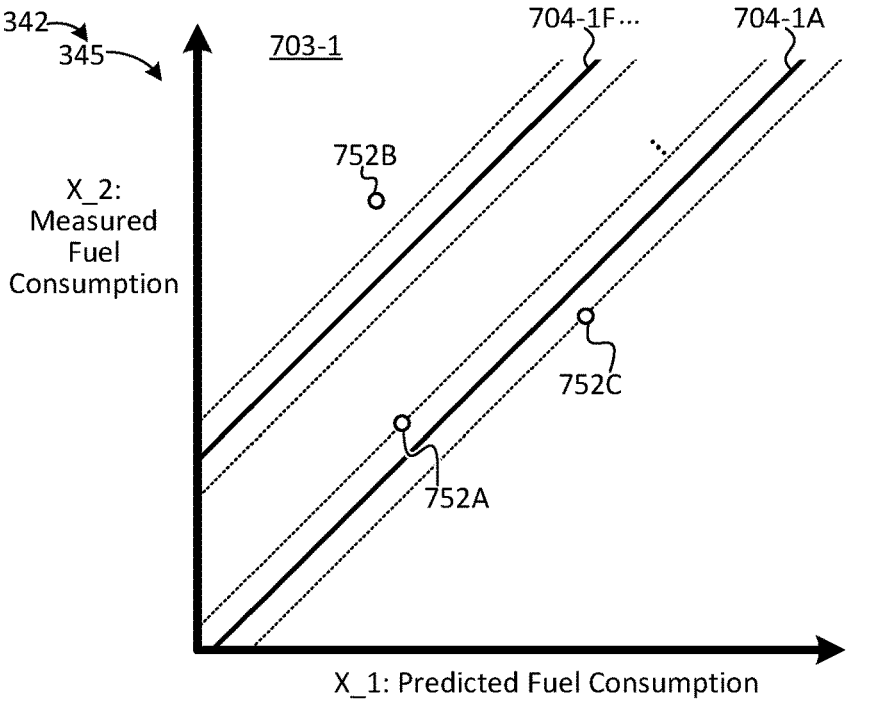
FIG. 7H illustrates aspects of example age-based support vector machines configured for fuel leak detection.

Plot 703-1 of FIG. 7H illustrates further examples of SVM and/or SVM decision boundaries 704-1. In the FIG. 7H implementation, the AI/ML model 342 may be configured to model relationships between measured fuel consumption and predicted fuel consumption across a range of FCS usage levels and/or ages. As disclosed herein, the efficiency of the FCS 110 may decrease with increasing usage level. As such, the deviation between measured fuel consumption (the first FC metric 122A) and corresponding predicted fuel consumption (FC metric 122B) may increase with increasing FCS age.

In the FIG. 7H example, the AI/ML CFG 345 may configure the AI/ML model 342 to implement a plurality of SVM and/or SVM decision boundaries 704-1A through 704-1F, each corresponding to a respective FCS age and/or usage range. The SVM decision boundaries 704-1A through 704-1F may comprise respective thresholds or margin hyperplanes 706 (not shown in FIG. 7H to avoid obscuring details of the illustrated examples). The SVM decision boundaries 704-1A through 704-1F may be configured to model the decreasing efficiency of the FCS 110 over time, e.g., per power efficiency data and/or a power efficiency map, as disclosed herein (e.g., from a low usage range A to a high usage range F). The SVM decision boundary 704-1A may be configured to detect fuel leak conditions of an FCS 110 during a first, low usage range A, the SVM decision boundary 704-1F may be configured to detect fuel leak conditions of the FCS 110 during a high or maximum usage range F, and so on. The learned SVM decision boundaries 704-1A through 704-1F may, therefore, be capable of distinguishing fuel consumption deviations that are indicative of fuel leak conditions at a range of different FCS usage levels and/or ages. For example, the SVM datapoint 752A may trigger detection of a fuel leak condition during the low usage range A but may not trigger fuel leak detection during subsequent usage ranges, such as usage range F. The fuel consumption deviation of SVM datapoint 752B may be indicative of a fuel leak condition regardless of FCS usage level (e.g., may be detected as a potential fuel leak during any of the usage ranges A through F). Conversely, the low fuel consumption deviation of SVM datapoint 752C may be indicative of nominal operation of the FCS 110 across usage ranges A through F.

Although examples of SVM based on particular types of related FC metrics 122 are described herein, the disclosure is not limited in this regard and could be adapted to implement SVM utilizing any suitable FC metrics 122. For example, plot 705 of FIG. 7I illustrates aspects of an SVM (and/or SVM decision boundary 704) configured to detect fuel leak conditions based, at least in part, on fuel consumption RoC 222 (and/or ΔRoC metrics 224), as disclosed herein.

Figure 7I:
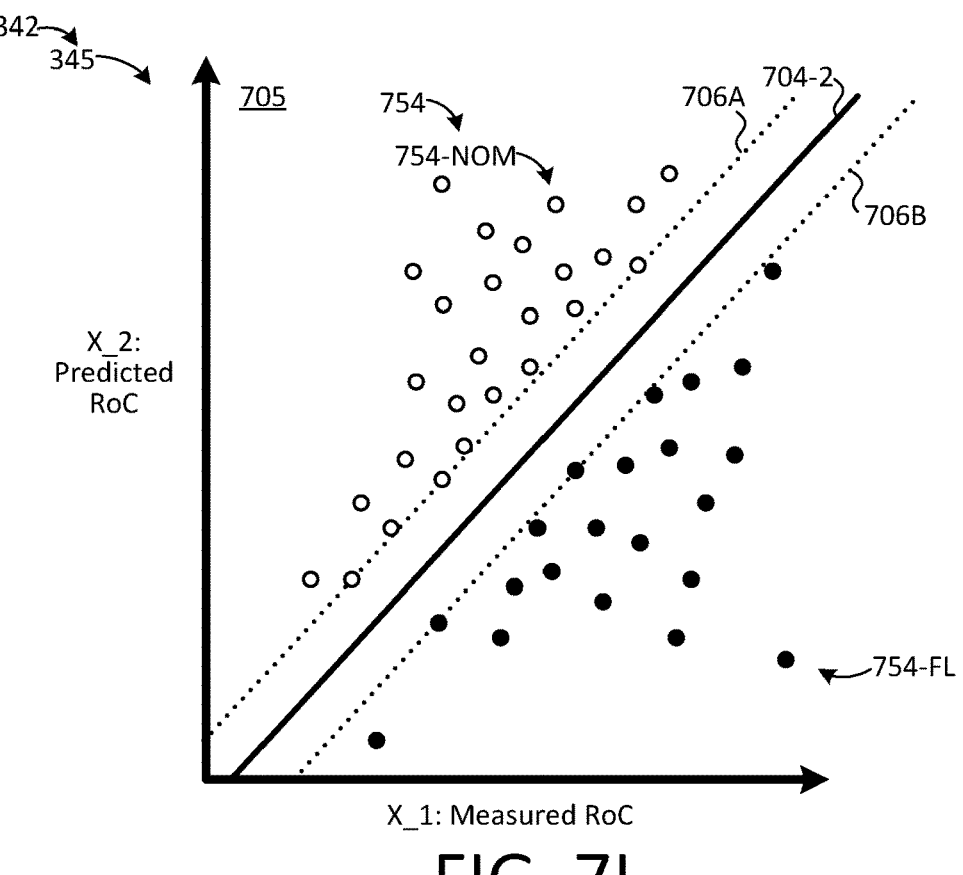
FIG. 7I illustrates aspects of another example of a support vector machine configured for fuel leak detection.

FIG. 7I illustrates another example of an AI/ML CFG 345 for an SVM decision boundary 704 based on related FC metrics 122 pertaining to the fuel consumption RoC 222. The SVM of the FIG. 7I example may comprise and/or implement a RoC SVM decision boundary 704-2. The SVM decision boundary 704-2 may be configured to classify RoC SVM datapoints 754 (AI/ML input data 722), each comprising a two-dimensional vector that comprises and/or is derived from a measured RoC 222A and corresponding predicted RoC 222B. In other words, the RoC SVM datapoints 754 may comprise intersections between the measured RoC 222A (along the horizontal or x axis) and corresponding predicted RoC 222B (along the vertical or y axis), or vice versa.

In the FIG. 7I implementation, the learned SVM decision boundary 704-2 and/or SVM margin hyperplanes 706 may be configured to separate RoC SVM datapoints 754-NOM (AI/ML input data 722) that are indicative of nominal operation of the FCS 110 from RoC SVM datapoints 754-FL that are indicative of fuel leak conditions. The nominal SVM datapoints 752-NOM may correspond to related FC metrics 122 where the predicted RoC 222B corresponds to the measured RoC 222A, e.g., the resulting ΔRoC metric 224 is within a threshold, such as a learned FC RoC threshold ($T_{FC\_RoC}$) or the like. The anomalous RoC SVM datapoints 754-FL may correspond to related FC metrics 122 where the measured RoC 222A deviates from the predicted RoC 222B, e.g., deviates by more than the FC RoC threshold or other metric, as disclosed herein.

In some implementations, the example SVM and/or SVM decision boundaries 704 disclosed herein may be learned by use of labeled AI/ML training data. For example, the SVM decision boundaries 704 and/or corresponding margin hyperplanes 706 may be learned by use of an AI/ML training dataset 730 comprising AI/ML input data 722 associated with known GT 735 (e.g., known AI/ML labels), as disclosed herein. Alternatively, or in addition, the SVM decision boundaries 704 may be learned and/or refined through unsupervised AI/ML techniques, such as reinforcement learning, operator feedback, and/or the like.

In some implementations, the AI/ML model 342 may be configured to learn a RoC SVM decision boundary 704-2 configured for use with FC metrics 122 corresponding to a range of different ages and/or usage levels. Alternatively, or in addition, the AI/ML model 342 may be configured to learn a plurality of different SVM and/or RoC SVM decision boundaries 704-2, each corresponding to a respective age and/or usage level. For example, the AI/ML CFG 345 may configure the AI/ML model 342 to implement a plurality of different SVM and/or SVM decision boundaries 704-2, each configured for use with an FCS 110 and/or FC machine 101 of a respective age or usage level, as illustrated in FIG. 7J.

Figure 7J:
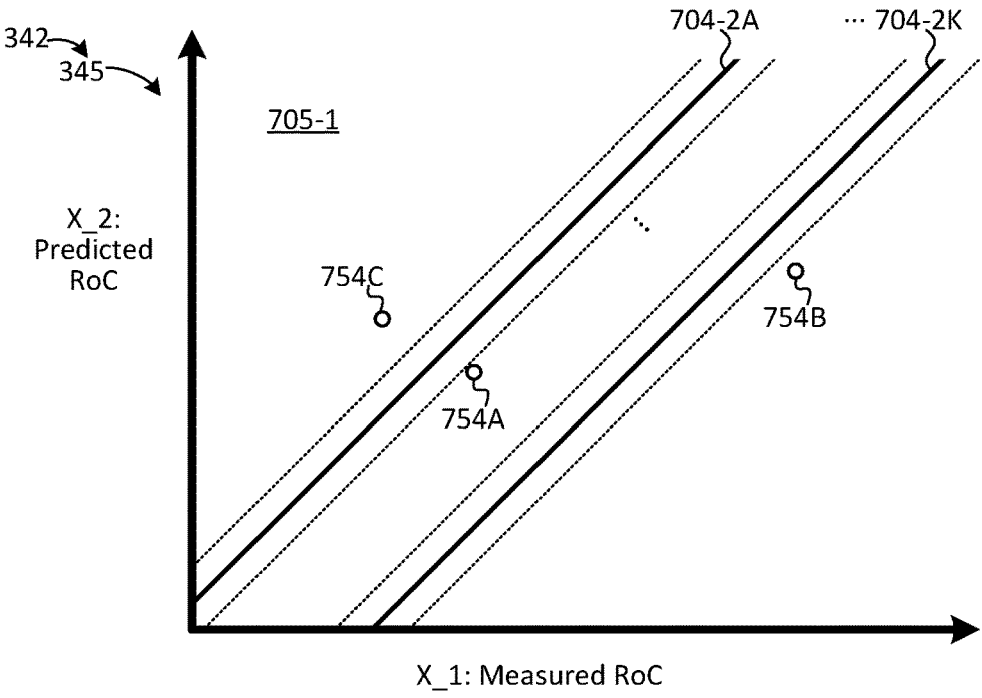
FIG. 7J illustrates aspects of additional examples age-based support vector machines configured for fuel leak detection.

Plot 705-1 of FIG. 7J illustrates further examples of SVM and/or RoC SVM decision boundaries 704-2. In the FIG. 7J implementation, the AI/ML model 342 may be configured to model relationships between measured RoC 222A and predicted RoC 222B across a range of FCS usage levels and/or ages. As disclosed herein, the efficiency of the FCS 110 may decrease with increasing usage level. As such, the ΔRoC metric 224 between measured RoC 222A (the first FC metric 122A) and corresponding predicted RoC 222B (FC metric 122B) may increase with increasing FCS age.

In the FIG. 7J example, the AI/ML CFG 345 may configure the AI/ML model 342 to implement a plurality of SVM and/or RoC SVM decision boundaries 704-2A through 704-2K, each corresponding to a respective FCS age and/or usage range. The SVM decision boundaries 704-2A through 704-2K may comprise respective thresholds or margin hyperplanes 706 (not shown in FIG. 7J to avoid obscuring details of the illustrated examples). The RoC SVM decision boundaries 704-2A through 704-2K may be configured to model the decreasing efficiency of the FCS 110 over time, e.g., per power efficiency data and/or a power efficiency map, as disclosed herein (e.g., from a low usage range A to a high usage range K). The RoC SVM decision boundary 704-2A may be configured to detect fuel leak conditions of an FCS 110 during a first, low usage range A, the RoC SVM decision boundary 704-2K may be configured to detect fuel leak conditions of the FCS 110 during a high or maximum usage range K, and so on. The learned RoC SVM decision boundaries 704-2A through 702-2K may, therefore, be capable of distinguishing ΔRoC metrics 224 that are indicative of fuel leak conditions at a range of different FCS usage levels and/or ages. For example, the RoC SVM datapoint 754A may trigger detection of a fuel leak condition during the low usage range A but may not trigger fuel leak detection during subsequent usage ranges, such as usage range K. The ΔRoC metric 224 of RoC SVM datapoint 754B may be indicative of a fuel leak condition regardless of FCS usage level (e.g., may be detected as a potential fuel leak during any of the usage ranges A through K). Conversely, the low ΔRoC metric 224 of SVM datapoint 754C may be indicative of nominal operation of the FCS 110 across usage ranges A through K.

Although particular examples of AI/ML models 342, AI/ML CFG 345, and/or corresponding AI/ML architectures, algorithms, and techniques are discussed herein, the disclosure is not limited in this regard and could be adapted to utilize any suitable AI/ML model 342 having any suitable AI/ML architecture configured for any suitable AI/ML algorithm and/or technique.

Figure 8:
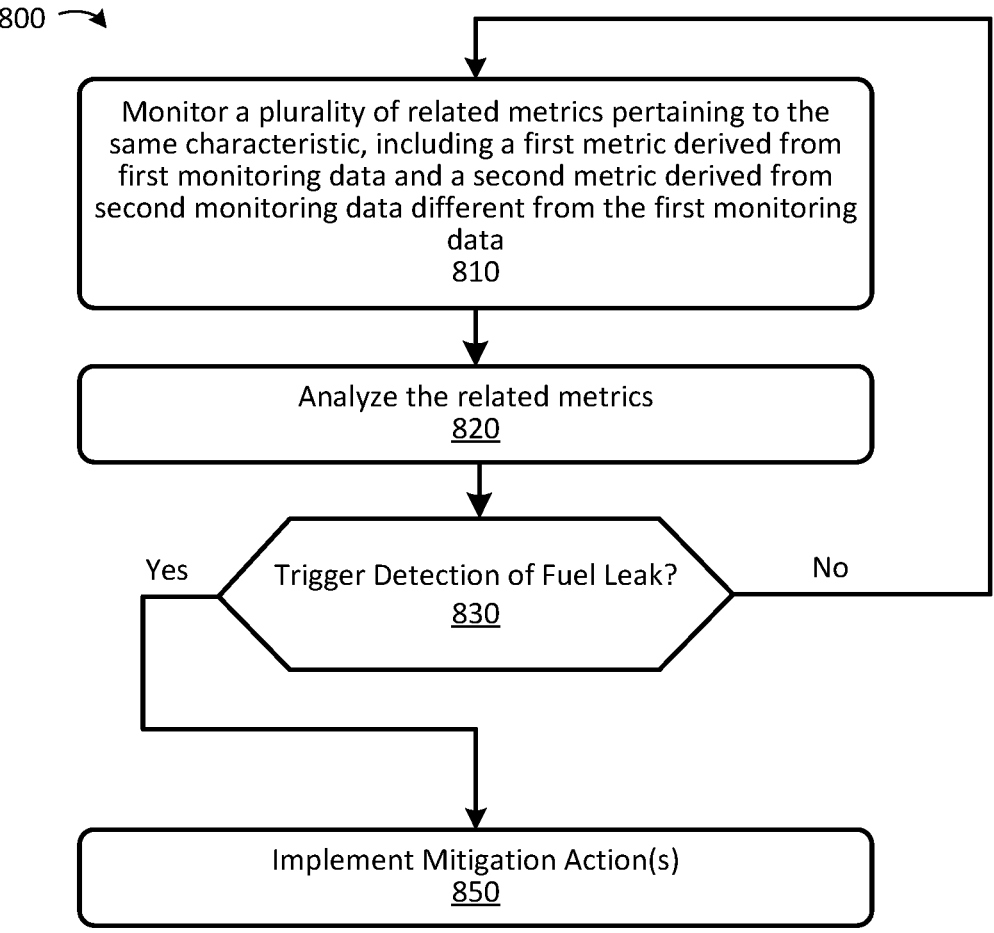
FIG. 8 is a flowchart illustrating an example of a method for monitoring a fuel cell.

FIG. 8 is a flowchart illustrating an example of a method 800 for monitoring a fuel cell. The steps and/or operations of the method 800 (and/or other methods disclosed herein) may be implemented by computing resources 131, such as the processor 132 and/or memory 133 of the FCM device 130 illustrated in FIG. 1. Steps and/or operations of the disclosed methods may be implemented and/or embodied as computer-readable instructions stored on or within NT storage, such as the NT storage 134 of the FCM device 130. The computer-readable instructions may be configured to cause a computing device to implement one or more method steps and/or operations. Alternatively, or in addition, one or more of the steps and/or operations may be implemented by hardware components, such as logic circuitry, processing circuitry, an ASIC, an FPGA, controller, programmable controller, and/or the like.

At 810, the method 800 may comprise monitoring a plurality of related metrics pertaining to the same characteristic of the FCS 110 and/or FC machine 101, including a first metric derived from first monitoring data and a second metric derived from second monitoring data different from the first monitoring data. In some implementations, 810 may comprise tracking a plurality of related FC metrics 122, each related FC metric 122 configured to track the FCCF 121 based on different types of FCM data 312. The related FC metrics 122 may be tracked during an FCM period 210. The FCM period 210 may correspond to a fueling cycle of the FCS 110. The start time ($T_S$) of the FCM period 210 may correspond to a fuel time of the FCS 110 and the end time ($T_E$) may correspond to a time the fuel storage 112 of the FCS 110 is exhausted and/or the FCS 110 is refueled.

The monitoring at 810 may comprise tracking a first FC metric 122A and a second FC metric 122B configured to monitor the same FCCF 121. The FCCF 121 may pertain to any suitable characteristic and/or feature related to operation and/or the operational behavior of the FCS 110, including, but not limited to: power output of the FCS 110, power supplied to a load 104 coupled to the FCS 110, fuel consumption of the FCS 110, and/or the like. In some implementations, the related FC metrics 122 may be configured to track power generated by the FCS 110, as illustrated in FIG. 2A. Alternatively, or in addition, the related FC metrics 122 may be configured to track fuel consumption of the FCS 110, as illustrated in FIGS. 4 and 6. The disclosure is not limited in this regard, however, and could be adapted to track any suitable FCCF 121, including, but not limited to: power output, power consumption, fuel consumption, fuel pressure, fuel flow rate, and/or the like.

The method may comprise deriving the first FC metric 122A from first FCM data 312A at 810. The first FCM data 312A may comprise direct measurements of the FCCF 121. For example, the first metric 122A may be configured to track power output of the FCS 110 and the first FCM data 312A may comprise direct power measurements, as illustrated in FIG. 2A. In another example, the first metric 122A may be configured to track fuel consumption of the FCS 110 and the first FCM data 312A may comprise direct measurements of one or more of: temperature and/or pressure of the fuel maintained within the fuel storage 112 of the FCS 110, a mass of the fuel, a weight of the fuel, fuel inflow measurements, fuel outflow measurements, and/or the like.

The monitoring at 810 may further comprise inferring and/or estimating a second FC metric 122B from second FCM data 312B. The second FCM data 312B may comprise indirect measurements pertaining to the FCCF 121. Deriving the second FC metric 122B may comprise determining expected values of the FCCF 121 from the indirect measurements. For example, the second FC metric 122B may be configured to infer the power output of the FCS 110 and the second FCM data 312B may comprise measurements pertaining to a fuel utilization of the FCS 110. In another example, the second FC metric 122B may be configured to infer fuel consumption of the FCS 110 and the second FCM data 312B may comprise measurements of one or more of a power output of the FCS 110, a power supplied to a load 104 coupled to the FCS 110, and/or the like.

At 820, the method 800 may comprise analyzing the related metrics. In some implementations, 820 may comprise determining and/or evaluating an error, difference, deviation, and/or other comparative analysis of the first FC metric 122A and second FC metric 122B. The analysis of 820 may comprise one or more of: deviation analysis (e.g., evaluating a deviation between the related FC metrics 122A and 122B) as in the first non-limiting examples disclosed herein, RoC analysis (e.g., analyzing the RoC 222 and/or ΔRoC metrics 224 of the FC metrics 122A and 122B) as in the second non-limiting examples disclosed herein, CD analysis (e.g., analyzing a CD metric 226 indicative of a cumulative error, deviation, and/or difference between the related FC metrics 122A and 122B and/or a CD RoC 228) as in the third non-limiting examples disclosed herein, window-based analysis, and/or the like. The analysis may further comprise producing an AD output 150 configured to indicate whether the related FC metrics 122 are indicative of anomalous operation of the FCS 110 (e.g., a fuel leak condition).

Alternatively, or in addition, at 820 the method 800 may comprise analyzing the related FC metrics 122A and 122B by use of an AI/ML engine 340 and/or AI/ML model 342, as disclosed herein. The AI/ML model 342 may comprise any suitable AI/ML components configured to implement any suitable AI/ML algorithm. The AI/ML model 342 may comprise one or more of: a linear predictor, a linear classifier, a linear regression predictor 702, an SVM and/or SVM decision boundary 704, an ANN, and/or the like. The evaluating may comprise configuring the AI/ML model 342 to produce an AD output 150 in response to AI/ML input data 722, the AI/ML input data 722 comprising and/or corresponding to the related FC metrics 122A and 122B acquired by the FCM module 120 at 810, as disclosed herein.

At 830, the method 800 may comprise determining whether to trigger detection of a fuel leak in the FCS 110 based on the analysis of 820, e.g., determine whether the related metrics are indicative of a fuel leak condition, as disclosed herein. The determining may comprise evaluating an output of the analysis of 820, such as a deviation, ΔRoC metric 224, AD output 150 produced by the AI/ML engine 340, and/or the like. The determination may be based, at least in part, on an error, difference, deviation, comparison and/or other analysis of the first FC metric 122A and the second FC metric 122B. The AD output 150 and/or determination of 830 may be based on one or more of: deviation analysis (e.g., evaluating a deviation between the related FC metrics 122A and 122B) as illustrated in FIG. 2A and the first non-limiting examples disclosed above, RoC analysis (e.g., analyzing RoC 222 and/or ΔRoC metrics 224 of the FC metrics 122A and 122B) as illustrated in FIGS. 2A, 2B and the second non-limiting examples disclosed above, CD analysis (e.g., analyzing a CD metric 226 indicative of a cumulative error, deviation, and/or difference between the related FC metrics 122A and 122B and/or a CD RoC 228) as illustrated in FIG. 2C and the third non-limiting examples disclosed above, window-based analysis, and/or the like.

Alternatively, or in addition, the determination at 830 may be based, at least in part, on evaluating an AD output 150 produced by an AI/ML model 342 in response to AI/ML input data 722 comprising the related FC metrics 122. The AD output 150 may comprise one or more of a label indicating whether the AI/ML input data 722 are indicative of a fuel leak condition, a value configured to quantify a degree to which the AI/ML input data 722 are indicative of a fuel leak condition, and/or the like.

If the determination at 830 is that the related metrics are not indicative of a fuel leak condition (or other anomaly) the flow may continue at 810; otherwise, the flow may continue at 850. At 850, the method 800 may comprise implementing one or more mitigation action(s) 352, as disclosed herein (e.g., by a mitigation module 350 or the like). The mitigation actions 352 may include, but are not limited to: alerting an operator of the FC machine 101 (and/or vehicle 102) of the detected leak, displaying information pertaining to the detected anomaly on HMI resources 135 of the FC machine 101, transmitting alert notifications to component(s) of the FC machine 101 through the internal network 108, transmitting alert notifications through the external network 138 (e.g., transmitting alert notifications to maintenance personnel, management personnel, and/or the like), and so on. In some implementations, the mitigation actions 352 may include controlling selected component(s) of the FC machine 101 and/or FCS 110, such as disabling operation of the FCS 110, closing output(s) of the fuel storage 112 (e.g., closing one or more output valves), closing input value(s) to the FCS 110, and so on.

In some implementations, the method 800 may further comprise maintaining the FCS 110 in a disabled state at 850. The FCS 110 may be maintained in the disabled state until a mitigation message 354 is received. The mitigation message 354 may be received through any suitable electronic communication means, including, but not limited to: an electronic communication network (e.g., the internal network 108, external network 138, or the like), HMI resources 135 of the FCM device 130 and/or FC machine 101, operator control inputs, and/or the like. The mitigation message 354 may comprise information indicating whether the potential fuel leak condition detected by the FCM module 120 has been mitigated.

In some implementations, the mitigation message 354 may comprise feedback data indicating whether a fuel leak condition was identified, e.g., the mitigation message 354 may indicate whether the AD output 150 was a false positive. The mitigation module 350 may provide feedback data to the analysis module 140. The AI/ML engine 340 may utilize the feedback data to, inter alia, refine and/or train the AI/ML model 342, e.g., as illustrated in FIG. 7B. For example, if the mitigation message 354 indicates that the AD output 150 was a false positive, the AI/ML engine 340 may update the AI/ML model 342 to prevent subsequent false positives in response to similar FC metrics 122. Conversely, if the feedback data indicates that a fuel leak condition was identified, the AI/ML engine 340 may update the AI/ML model 342 to reinforce the AD output 150, e.g., ensure that anomalies are detected for similar FC metrics 122.

Figure 9:
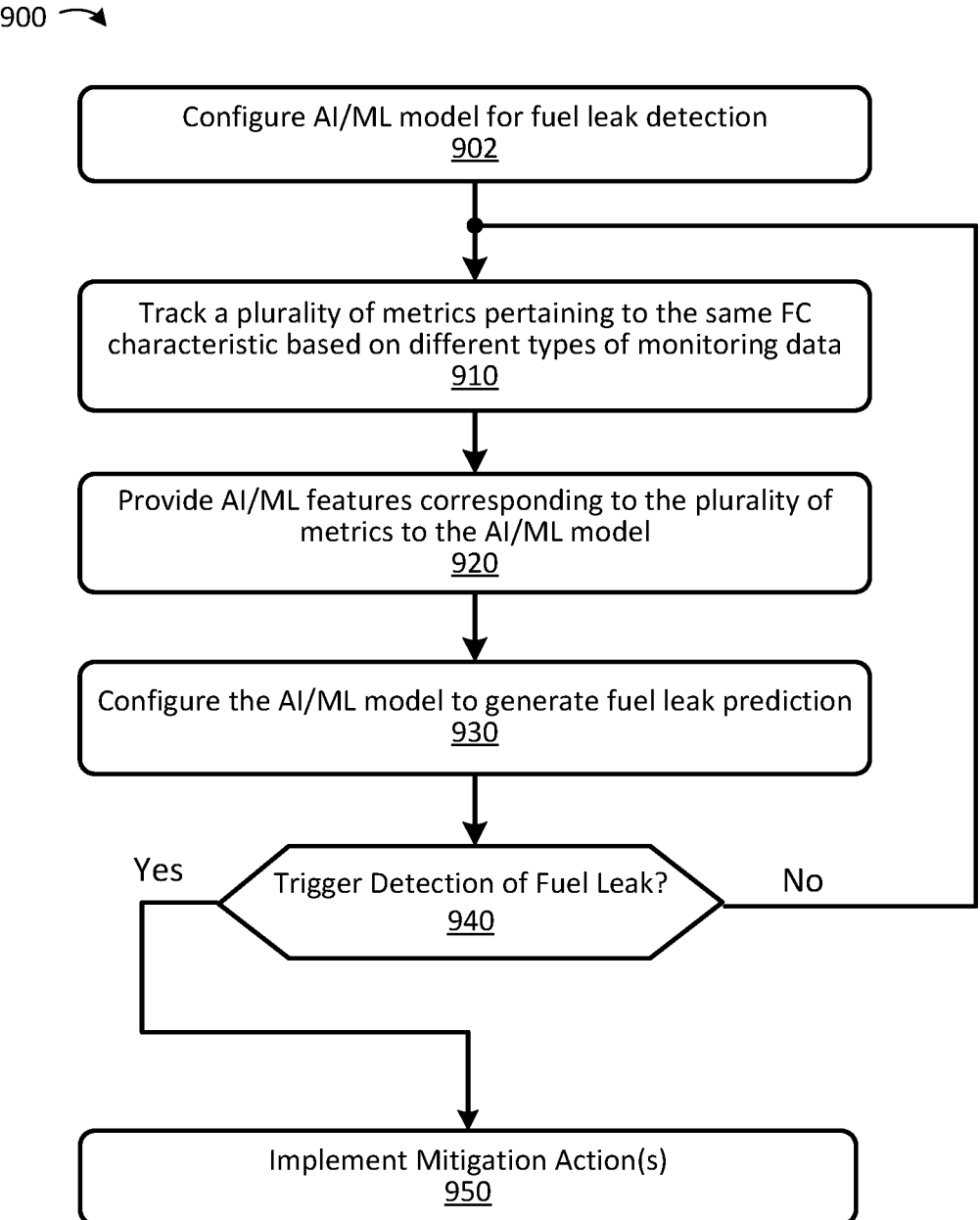
FIG. 9 is a flowchart illustrating another example of a method for monitoring a fuel cell.

FIG. 9 is a flow diagram of another example of a method 900 for monitoring a fuel cell. At 902, the method 900 may comprise configuring an AI/ML model 342 for fuel leak detection. The configuring at 902 may comprise implementing a predetermined AI/ML CFG 345, as disclosed herein. Alternatively, or in addition, 902 may comprise implementing one or more AI/ML training procedures, e.g., by use of AI/ML entries 732 of a dataset 730 as illustrated in FIG. 7B. The AI/ML training procedures may be implemented by a training module 710 and may be configured to develop an AI/ML model 342 and/or AI/ML CFG 345 capable of identifying AI/ML input data 722 that is indicative of an FCS anomaly, such as a fuel leak condition. The AI/ML training procedures may comprise providing AI/ML input data 722 of a selected AI/ML entry 732 to the AI/ML model 342, configuring the AI/ML model 342 to produce an AD output 150 in response to the AI/ML input data 722, comparing the AD output 150 to GT data 735 of the AI/ML entry 732 (e.g., a known, predetermined AD output 150), and updating the AI/ML model 342 and/or AI/ML CFG 345 based on the comparing.

The method 900 may further comprise tracking a plurality of metrics pertaining to the same $F_C$ characteristic based on different types of monitoring data at 910. In some implementations, the tracking may comprise a) deriving a first FC metric 122A from first FCM data 312A comprising direct measurements of an FCCF 121 and b) inferring a second FC metric 122B for the same FCCF 121 from second FCM data 312B comprising indirect measurements pertaining to the FCCF 121. At 910, the related FC metrics 122 may be tracked during and/or over an FCM period 210, as disclosed herein.

At 920, the method 900 may comprise providing AI/ML features corresponding to the plurality of metrics to an AI/ML model 342. In some implementations, the AI/ML features may comprise AI/ML input data 722, as disclosed herein. The AI/ML input data 722 may comprise respective datapoints, e.g., may comprise respective sets of related FC metrics 122A and 122B. Alternatively, or in addition, the AI/ML input data 722 may comprise and/or be derived from a plurality of FC metrics 122A and 122B, such as FC metrics 122A and 122B within a window 212 of the FCM period 210 or the like.

The AI/ML model 342 may be configured to generate a fuel leak prediction in response to the AI/ML input data 722 at 930. The fuel leak prediction may comprise and/or be embodied by an AD output 150. The AD output 150 may comprise a label or other indication of whether the AI/ML input data 722 and/or corresponding FC metrics 122A and 122B are indicative of a fuel leak condition. Alternatively, or in addition, the AD output 150 may comprise a value configured to quantify a degree to which the AI/ML input data 722 are indicative of a fuel leak condition (e.g., may comprise a value between 0 and 1, with values closer to 1 being indicative of a fuel leak condition).

At 940, the method 900 may comprise determining whether to trigger detection of a fuel leak. The determination of 940 may be based, at least in part, on the AD output 150 produced at 930, as disclosed herein.

If no fuel leak condition is predicted, the flow may continue back at 910; otherwise, the flow may continue at 950. One or more mitigation action(s) 352 may be implemented at 950 in response to detection of the fuel leak condition, as disclosed herein.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general-purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in continuation patent applications, claims presented in a post-grant proceeding (e.g., reissue, reexamination, inter partes review, and/or post-grant review), and equivalents to the foregoing claims.

The invention claimed is:

1. A method for monitoring a fuel cell system of a vehicle, the method comprising:

deriving a first metric from first monitoring data, the first metric configured to track a specified characteristic of the fuel cell system during a monitoring period;

deriving a second metric from second monitoring data, the second metric configured to track the specified characteristic of the fuel cell system during the monitoring period;

generating features corresponding to a machine-learned (ML) model from the first metric and the second metric, the features corresponding to a rate of change of the first metric and a rate of change of the second metric;

configuring the ML model to determine a leak prediction for the fuel cell system based, at least in part, on the features generated from the first metric and the second metric, the features indicating a difference between the rate of change of the first metric and the rate of change of the second metric at respective times within the monitoring period;

triggering detection of a fuel leak in the fuel cell system based, at least in part, on the leak prediction determined by the ML model; and implementing a mitigation action at the vehicle in response to detection of the fuel leak, the mitigation action comprising closing a valve of the fuel cell system.

2. The method of claim 1, wherein:

the specified characteristic pertains to one or more of: a power output of the fuel cell system and fuel consumption of the fuel cell system.

3. The method of claim 1, wherein:

the first monitoring data used to derive the first metric comprises direct measurements of the specified characteristic;

the second monitoring data comprises indirect measurements pertaining to the specified characteristic; and deriving the second metric comprises determining expected values of the specified characteristic from the indirect measurements.

4. The method of claim 1, wherein:

the specified characteristic comprises a fuel consumption of the fuel cell system; and the first monitoring data comprises measurements acquired from one or more of the fuel cell system, fuel storage of the fuel cell system, and a fuel coupling of the fuel cell system.

5. The method of claim 4, wherein the first monitoring data comprises measurements of one or more of: a temperature of fuel within the fuel storage of the fuel cell system, a pressure of the fuel, a mass of the fuel, fuel inflow to the fuel cell system, and fuel outflow from the fuel cell system.

6. The method of claim 4, wherein:

the second monitoring data is configured to quantify one or more of an output power of the fuel cell system and an input power supplied to a load coupled to the fuel cell system; and the second metric is derived by use of power efficiency data pertaining to the fuel cell system.

7. The method of claim 1, wherein the specified characteristic corresponds to power generated by the fuel cell system, and wherein the first monitoring data comprises power measurements and the second monitoring data comprises measurements pertaining to fuel consumption by the fuel cell system.

8. The method of claim 1, wherein a start time of the monitoring period corresponds to a fueling time of the fuel cell system.

9. The method of claim 1, wherein the ML model is configured to determine the leak prediction for the fuel cell system based, at least in part, on fuel cell system (FCS) metadata, the FCS metadata comprising information pertaining to one or more of operating conditions of the fuel cell system, operator inputs to the fuel cell system, and usage of the fuel cell system.

10. The method of claim 9, further comprising:

training the ML model to distinguish features corresponding to non-anomalous operation of the fuel cell system from anomalous operation of the fuel cell system, the anomalous operation corresponding to a fuel leak condition.

11. The method of claim 9, wherein the ML model comprises one or more of a linear regression predictor and a support vector machine.

12. The method of claim 1, wherein the mitigation action comprises one or more of disabling operation of the fuel cell system, closing an input valve of the fuel cell system, closing an output valve of the fuel cell system, alerting an operator to detection of the fuel leak, and transmitting an alert pertaining to detection of the fuel leak through an external network.

13. The method of claim 1, further comprising selecting the ML model based, at least in part, on one or more of an age of the fuel cell system and a usage level of the fuel cell system.

14. The method of claim 1, further comprising training the ML model to identify metrics indicative of anomalous operation of the fuel cell system.

15. An apparatus to monitor a fuel cell system of a vehicle, the apparatus comprising:

a processor operatively coupled to a memory;

a monitoring module configured for operation on the processor, the monitoring module configured to:

determine a first metric configured to track a specified operational characteristic of the fuel cell system, the first metric derived from first monitoring data comprising measurements of the specified operational characteristic, and determine a second metric configured to track the specified operational characteristic of the fuel cell system, the second metric comprising estimates of the specified operational characteristic derived from second monitoring data having a defined physical relationship to the specified operational characteristic;

a feature extraction module configured to generate features corresponding to a machine-learned model (ML) from the first metric and the second metric, the features corresponding to a rate of change of the first metric and a rate of change of the second metric;

an analysis module comprising the ML model, the analysis module configured to trigger detection of a fuel leak based, at least in part, on a leak prediction determined for the fuel cell system by the ML model, the leak prediction based on the features generated from the first metric and the second metric, the features indicating a difference between the rate of change of the first metric and the rate of change of the second metric at respective times within the monitoring period; and a mitigation module configured to implement a mitigation action at the vehicle in response to detection of the fuel leak, the mitigation action comprising closing a valve of the fuel cell system.

16. The apparatus of claim 15, wherein the specified operational characteristic pertains to fuel consumption of the fuel cell system, the apparatus further comprising:

a first monitoring unit configured to receive first monitoring data, the first monitoring data acquired from one or more of the fuel cell system, fuel storage of the fuel cell system, and a fuel coupling of the fuel cell system;

wherein the first monitoring data comprises direct measurements pertaining to the fuel consumption of the fuel cell system, the direct measurements including one or more of a temperature of fuel stored within the fuel storage, a pressure of the fuel, a mass of the fuel, fuel inflow to the fuel cell system, and fuel outflow from the fuel cell system; and wherein the first metric is derived from the direct measurements pertaining to the fuel consumption of the fuel cell system.

17. The apparatus of claim 16, further comprising:

a second monitoring unit configured to acquire the second monitoring data from one or more of the fuel cell system and a load coupled to the fuel cell system, the second monitoring data comprising indirect measurements pertaining to the fuel consumption of the fuel cell system, the indirect measurements including one or more of power generated by the fuel cell system and power supplied to the load coupled to the fuel cell system;

wherein the second metric is derived from the indirect measurements and power efficiency data pertaining to the fuel cell system.

18. The apparatus of claim 15, wherein the specified operational characteristic pertains to a power output of the fuel cell system, the apparatus further comprising:

a first monitoring unit configured to acquire the first monitoring data from one or more of the fuel cell system and a load coupled to the fuel cell system, the first monitoring data comprising direct measurements pertaining to the power output of the fuel cell system, the direct measurements comprising one or more of power generated by the fuel cell system and power supplied to the load coupled to the fuel cell system, wherein the first metric is derived from the direct measurements; and a second monitoring unit configured to receive the second monitoring data, the second monitoring data acquired from one or more of the fuel cell system, fuel storage of the fuel cell system, and a fuel coupling of the fuel cell system, the second monitoring data comprising indirect measurements pertaining to the power output of the fuel cell system, the indirect measurements comprising one or more of a temperature of fuel stored within the fuel storage, a pressure of the fuel, a mass of the fuel, fuel inflow to the fuel cell system, and fuel outflow from the fuel cell system;

wherein the second metric is derived from the indirect measurements and power efficiency data pertaining to the fuel cell system.

19. The apparatus of claim 15, wherein the ML model is configured to determine the leak prediction for the fuel cell system based, at least in part, on fuel cell system (FCS) metadata, the FCS metadata comprising information pertaining to one or more of operating conditions of the fuel cell system, operator inputs to the fuel cell system, and usage of the fuel cell system.

20. The apparatus of claim 15, wherein the ML model comprises one or more of a linear regression predictor and a support vector machine.

21. The apparatus of claim 15, wherein the mitigation action comprises one or more of disabling operation of the fuel cell system, closing an input valve of the fuel cell system, closing an output valve of the fuel cell system, alerting an operator to detection of the fuel leak, and transmitting an alert pertaining to detection of the fuel leak through an external network.

22. The apparatus of claim 15, wherein the analysis module is further configured to select the ML model from a plurality of ML models based, at least in part, on one or more of an age of the fuel cell system and a usage level of the fuel cell system.

23. The apparatus of claim 15, further comprising a training module configured to train the ML model to identify metrics indicative of anomalous operation of the fuel cell system.

24. A non-transitory computer-readable storage medium comprising instructions configured to cause a processor of a computing device to implement operations for monitoring a fuel cell system of a vehicle, the operations comprising:

deriving a first metric from first monitoring data, the first metric configured to track fuel consumed by the fuel cell system, the first monitoring data comprising measurements of one or more of a temperature of fuel stored within fuel storage of the fuel cell system, a pressure of the fuel, a mass of the fuel, an inflow of fuel to the fuel cell system, and an outflow of fuel from the fuel cell system;

deriving a second metric from second monitoring data, the second metric comprising estimates of the fuel consumed by the fuel cell system derived from indirect measurements of the second monitoring data and power efficiency data pertaining to the fuel cell system, the indirect measurements comprising one or more of a power output of the fuel cell system and power supplied to a load coupled to the fuel cell system;

generating features corresponding to a machine-learned (ML) model from the first metric and the second metric, the features corresponding to a rate of change of the first metric and a rate of change of the second metric;

configuring the ML model to determine a leak prediction for the fuel cell system based, at least in part, on the features generated from the first metric and the second metric, the features indicating a difference between the rate of change of the first metric and the rate of change of the second metric at respective times within the monitoring period;

triggering detection of a leak in the fuel cell system based, at least in part, on the leak prediction determined by the ML model; and implementing a mitigation action at the vehicle in response to detection of the leak in the fuel cell system, the mitigation action comprising closing a valve of the fuel cell system.

25. The non-transitory computer-readable storage medium of claim 24, the operations further comprising:

receiving the first monitoring data, the first monitoring data acquired from one or more of the fuel cell system, the fuel storage of the fuel cell system, and a fuel coupling of the fuel cell system; and receiving the second monitoring data, the second monitoring data acquired from one or more of the fuel cell system and the load coupled to the fuel cell system.

26. The non-transitory computer-readable storage medium of claim 24, wherein the ML model is configured to determine the leak prediction for the fuel cell system based, at least in part, on fuel cell system (FCS) metadata, the FCS metadata comprising information pertaining to one or more of operating conditions of the fuel cell system, operator inputs to the fuel cell system, and usage of the fuel cell system.

27. The non-transitory computer-readable storage medium of claim 24, wherein the ML model comprises one or more of a linear regression predictor and a support vector machine decision boundary.

28. The non-transitory computer-readable storage medium of claim 24, the operations further comprising selecting the ML model based, at least in part, on one or more of an age of the fuel cell system and a usage level of the fuel cell system.

29. The non-transitory computer-readable storage medium of claim 24, the operations further comprising training the ML model to identify metrics indicative of anomalous operation of the fuel cell system.

* * * * *